(12) United States Patent
Senchuk

(10) Patent No.: US 7,900,568 B2
(45) Date of Patent: Mar. 8, 2011

(54) SEED AND FERTILIZER OPENER AND SEEDING IMPLEMENT FEATURING SAME

(76) Inventor: Craig Senchuk, Brandon (CA)

( * ) Notice: Subject to any disclaimer, the term of this patent is extended or adjusted under 35 U.S.C. 154(b) by 0 days.

(21) Appl. No.: 12/481,838

(22) Filed: Jun. 10, 2009

(65) Prior Publication Data

US 2009/0308296 A1 Dec. 17, 2009

Related U.S. Application Data

(60) Provisional application No. 61/073,052, filed on Jun. 17, 2008.

(51) Int. Cl.
*A01C 7/00* (2006.01)
*A01C 9/00* (2006.01)
*A01C 23/00* (2006.01)
(52) U.S. Cl. .......... 111/119; 111/129; 111/187; 111/188
(58) Field of Classification Search .................. 111/118, 111/119, 127, 129, 170, 186–188
See application file for complete search history.

(56) References Cited

U.S. PATENT DOCUMENTS 4,409,910 A * 10/1983 Hoyle et al. ................. 111/159
6,405,665 B1 6/2002 Henry et al.
7,152,539 B2 * 12/2006 Swanson ...................... 111/119

FOREIGN PATENT DOCUMENTS

CA 2 432 272 12/2003

OTHER PUBLICATIONS

E-mail from Brian Cruson to Craig Senchuk regarding Dutch Industries Ltd. low draft paired row opener.

* cited by examiner

*Primary Examiner* — Christopher J. Novosad
(74) *Attorney, Agent, or Firm* — Ade & Company Inc.; Kyle R. Satterthwaite; Ryan W. Dupuis

(57) ABSTRACT

An opener for mounting on a shank of an agricultural implement features a central body to be mounted on the shank, furrowing portions carried on the central body to form a seed bed as the central body is pulled through ground on the shank in a forward working direction, a seed delivery passage operable to deliver seed onto the seed bed from a seed outlet on a first side of the central body, and a fertilizer delivery passage operable to deliver fertilizer onto the seed bed from a second side of the central body. In use, the opener delivers the seed and the fertilizer onto the same seed bed on opposite sides of the central body. A rubber cover seals closed an upper end of the central body to prevent moisture from anhydrous ammonia tubes from dripping into the body, and is adaptable to accommodate seed tubes of different diameters.

19 Claims, 12 Drawing Sheets

SEED AND FERTILIZER OPENER AND SEEDING IMPLEMENT FEATURING SAME

This application claims benefit under 35 U.S.C. 119 of U.S. Provisional Patent Application Ser. No. 61/073,052, filed Jun. 17, 2008.

The present invention relates generally to agricultural implements and more particularly to openers for a seeder or drill capable of delivering both seed and fertilizer in a single pass.

BACKGROUND OF THE INVENTION

A number of openers for seeders or drills have been developed for single pass placement of separately delivered and spaced apart seed and fertilizer, a practice sometimes referred to as double shooting. This practice provides the obvious benefits of reduced fuel and labour usage and is also advantageous to those looking to reduce tillage. However, when using simultaneously depositing seed and fertilizer, whether liquid or granular (urea) or anhydrous ammonia ($NH_3$) fertilizer, there is a concern in providing sufficient spacing between the deposited seed and fertilizer to avoid potentially damaging effects on the seed.

Prior art approaches to double shooting have typically been to use separate openers on the same drill or seeder to deliver the seed and fertilizer or to use openers having two or three outlets to side band the fertilizer alongside a single seed row or deposit fertilizer between a pair of seed rows. The use of two dedicated openers, for example in mid-row banding where a separate opener deposits fertilizer between two single shoot seed-depositing openers, is undesirable to those looking to keep tillage to a minimum, while in each of the single-opener side banding or paired row practices, the spacing between the seed and the fertilizer may not always be sufficient, as the fertilizer and seed outlets are in fairly close proximity. In side banding, the single seed outlet is typically found centrally on the opener with the fertilizer outlet being located slightly off to one side. In paired row applications, the two seed outlets are offset to opposite sides of the opener's central vertical plane, but the fertilizer is delivered between them at a central outlet. Delivery of the fertilizer to a depth somewhat below that of the seed has been applied in paired row applications to improve the separation, but this can cause unwanted disruption to the seed bed, potentially leading to inconsistency in seed placement and resulting emergence.

SUMMARY OF THE INVENTION

According to one aspect of the invention there is provided an opener for mounting on a shank of an agricultural implement, the opener comprising:

a central body having a mounting portion arranged for mounting on the shank;

furrowing portions carried on the central body and arranged to form a seed bed as the central body is pulled through ground on the shank in a forward working direction, the furrowing portion comprising first and second leading edges situated on opposite first and second sides of the central body respectively;

a seed delivery passage comprising a seed inlet and a seed outlet at opposite ends thereof and being operable to deliver seed onto the seed bed, the seed outlet being situated on the first side of the central body in a position trailing the first leading edge of the furrowing portions in the forward working direction; and a fertilizer delivery passage comprising a fertilizer inlet and a fertilizer outlet at opposite ends thereof and being operable to deliver fertilizer onto the seed bed, the outlet being situated on the second side of the central body in a position trailing the second leading edge of the furrowing portion in the forward working direction;

whereby the double shoot opener is operable to deliver the seed and the fertilizer onto the same seed bed on opposite sides of the central body.

Preferably the seed outlet opens rearwardly to face at least partly in a direction opposite the forward working direction.

Preferably the fertilizer outlet opens rearwardly to face at least partly in a direction opposite the forward working direction.

Preferably each outlet opening rearwardly also faces partly in a laterally outward direction away from the central body.

Preferably the seed and fertilizer outlets are each located entirely laterally outward from the central body.

Preferably there is provided a common delivery chamber through which the seed and fertilizer passages extend to the seed and fertilizer outlets.

Preferably the common delivery chamber is carried on the central body, spans thereacross from the first side to the second side and trails the leading edges of the furrowing portions in the forward working direction.

Preferably one of the passages comprises a conduit passing through the delivery chamber without communication between interiors of the conduit and the chamber.

Preferably the other one of the passages is in open communication with the chamber through which it passes.

Preferably the seed and fertilizer outlets are defined at openings in the chamber.

Preferably the chamber comprises a barrier positioned between the seed and fertilizer passages to prevent mixing of the seed and fertilizer within the chamber.

Preferably the barrier is arranged to prevent discharge of the seed through the fertilizer outlet and discharge of fertilizer through the seed outlet.

The fertilizer passage may comprise a tube arranged to receive liquid fertilizer at the inlet end thereof. Alternatively, the fertilizer passage may comprise a tube arranged to receive anhydrous ammonia fertilizer at the inlet end thereof, in which case there is preferably provided an insulation layer fitted about the tube. When fluid fertilizer is used, whether liquid fertilizer or anhydrous ammonia fertilizer, and the seed and fertilizer passages pass through a hollow interior of the central body from a top end thereof, preferably a cover fits onto the top end of the central body to seal around the passages. In this instance, the cover preferably comprises rubber.

As a further alternative, the fertilizer passage may comprise a chute or channel arranged for receipt of granular fertilizer.

Preferably the central body comprises a hollow portion through which the seed and fertilizer passages pass to the seed and fertilizer outlets.

Preferably there is provided a connection element proximate a rear end of the central body for cooperation with a corresponding connection element defined on the shank of the agricultural implement to facilitate coupling thereto, the seed and fertilizer outlets leading the connection element in the forward working direction.

Preferably there are provided covering surfaces carried on the central body and each extending between a respective one of the first and second leading edges and a respective one of the seed and fertilizer outlets on a respective one of the first and second sides of the central body.

There may be provided an additional fertilizer delivery passage comprising an additional fertilizer inlet and an additional fertilizer outlet at opposite ends thereof and being operable to deliver a second fertilizer onto the seed bed, the additional fertilizer outlet being situated on between the fertilizer outlet and seed outlet in a transverse direction crossing the forward working direction. In this instance, preferably fluid fertilizer is delivered through the primary fertilizer delivery passage, the additional fertilizer delivery passage comprises a hollow interior portion of the central body through which granular fertilizer can be delivered, and the additional fertilizer outlet comprises an opening in the central body.

According to a second aspect of the invention there is provided a seeding implement comprising:

a mobile frame operable for movement in a forward working direction;

seed and fertilizer delivery systems carried on the frame and operable to deliver seed and fertilizer through seed and fertilizer delivery conduits respectively;

a plurality of shanks carried on the mobile frame to depend downward therefrom; and a plurality of openers according to the first aspect of the invention, each opener being mounted to a respective one of the plurality of shanks so as to form a seed bed when pulled through ground on the shanks in the forward working direction by movement of the mobile frame;

the seed and fertilizer delivery conduits being connected to the seed and fertilizer inlets of the openers and the seed and fertilizer delivery system being operable to deliver seed and fertilizer to each opener for subsequent discharge of seed and fertilizer on opposite sides of the central body thereof.

According to a third aspect of the invention there is provided an opener for mounting on a shank of an agricultural implement, the opener comprising:

a central body having a mounting portion arranged for mounting on the shank;

furrowing portions carried on the central body and arranged to form a furrow as the central body is pulled through ground on the shank in a forward working direction;

a seed delivery passage extending through a hollow portion of the central body to a seed outlet carried on the central body to deliver seed into the furrow;

a fertilizer delivery passage extending through the hollow portion of the central body to a seed outlet carried on the central body to deliver seed into the furrow; and a fluid impervious cover arranged to fit over a top end of the hollow portion of the central body in sealing engagement around the seed and fertilizer delivery passages.

Preferably the cover comprises a seed bore formed in the cover, the seed bore having a decrease in diameter thereof moving toward an inlet side of the cover so that cutting away of a portion of the cover defining an end of the bore nearest the inlet side of the cover and defining said decrease in diameter increases a diameter of seed conduit receivable in the seed bore from the inlet side of the cover.

Preferably the cover comprises a fertilizer bore formed in the cover and having a closed inlet end and the fertilizer passage comprises a fertilizer tube extending into the hollow portion of the central body through the top end thereof and having a sharp top end pierceable through the closed inlet end of the fertilizer bore under lowering of the cover onto the top end of the hollow portion of the central body to sealingly dispose the cover around the fertilizer tube.

BRIEF DESCRIPTION OF THE DRAWINGS

In the accompanying drawings, which illustrate exemplary embodiments of the present invention.

DETAILED DESCRIPTION

Figure 1:
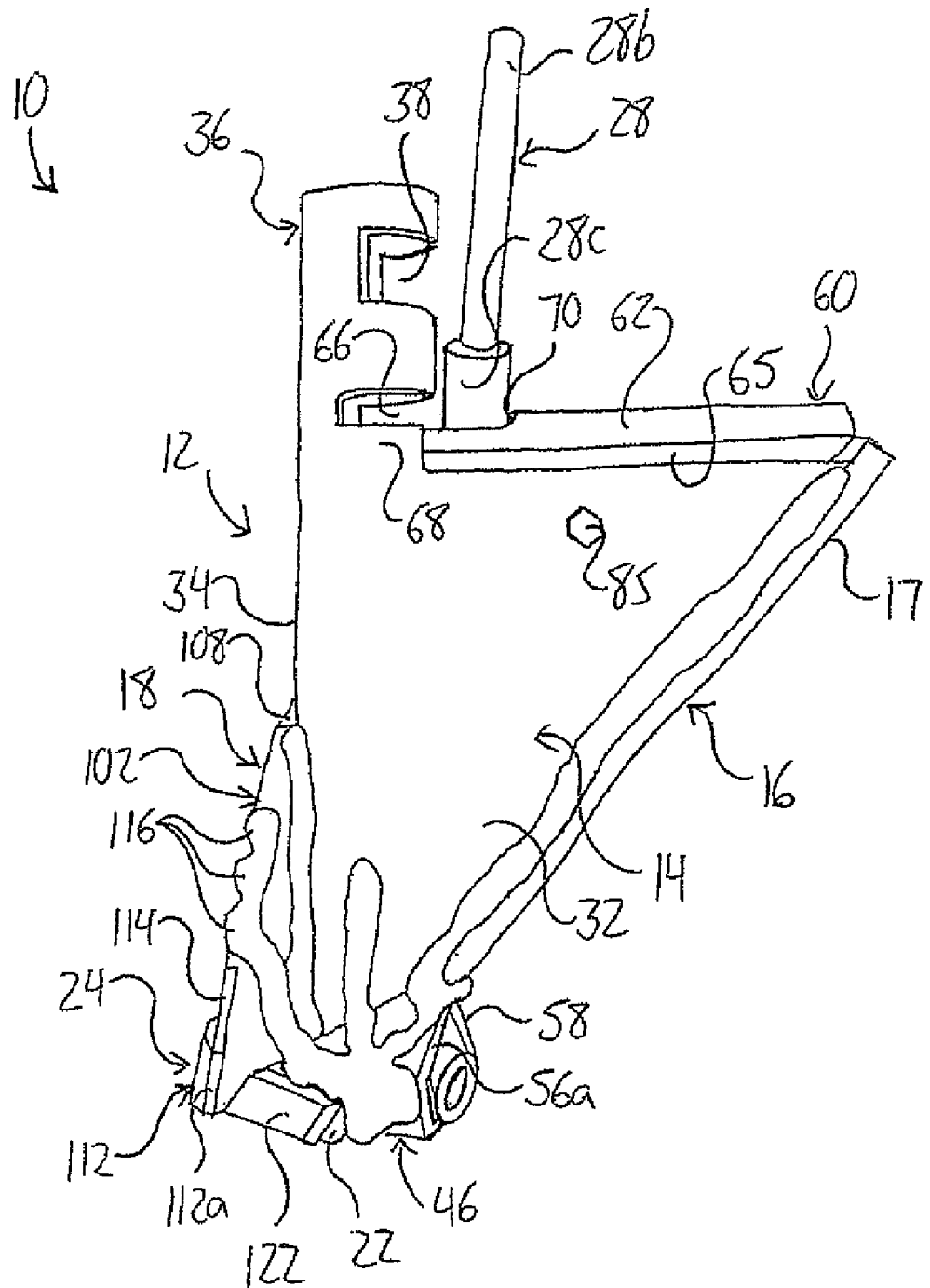
FIG. 1 is a side view of a first embodiment double shoot opener for mounting on a C-shank of a seeder or drill.

FIGS. 1 to 6 show a first embodiment double shoot opener 10 arranged for installation on a C-shank of an air seeder or drill for pulling through soil to open a seed furrow in the ground and simultaneously deposit seed and fertilizer into the furrow atop a single flat horizontal seed shelf formed therein by the opener. The first embodiment opener 10 features a central body 12 having a hollow delivery portion 14 that is somewhat triangular or wedge-like shape when viewed from the side of the first embodiment opener, is relatively narrow in a transverse direction of the opener and has a sloped rear end or edge 16 arranged at an upper portion 17 thereof for fastening to the leading side of a C-shank near the lower end thereof so that the delivery portion 14 extends forward and downward from the shank. A solid opening portion or ground-engaging portion 18 of the central body 12 is fixed to a front end of the delivery portion 14 to extend forward therefrom over more than half of the full height of the delivery portion 14.

Figure 5:
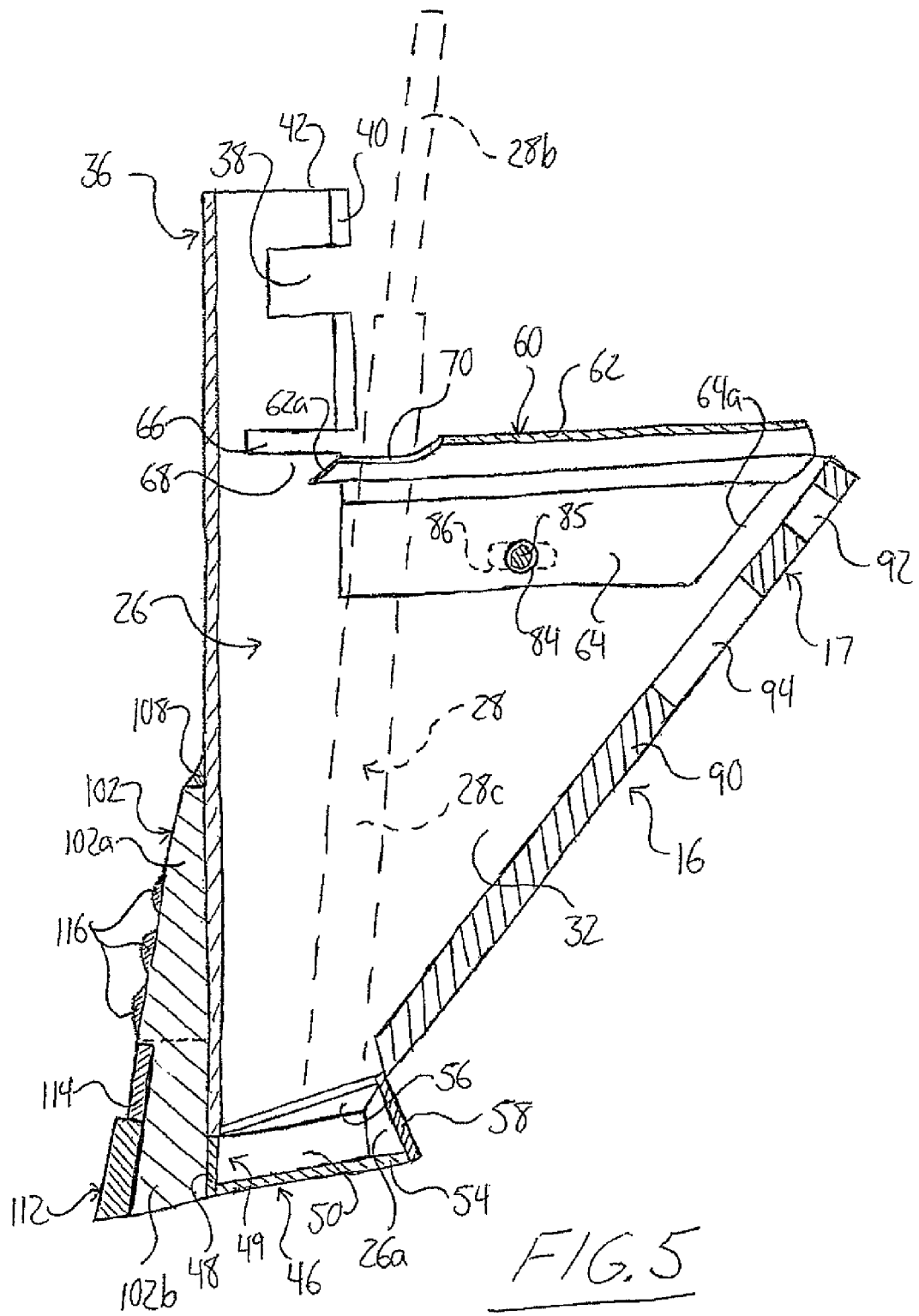
FIG. 5 is a cross sectional view of the opener of FIG. 3 as taken along line V-V thereof with the fertilizer tube removed but shown in broken lines for illustration.
Figure 6:
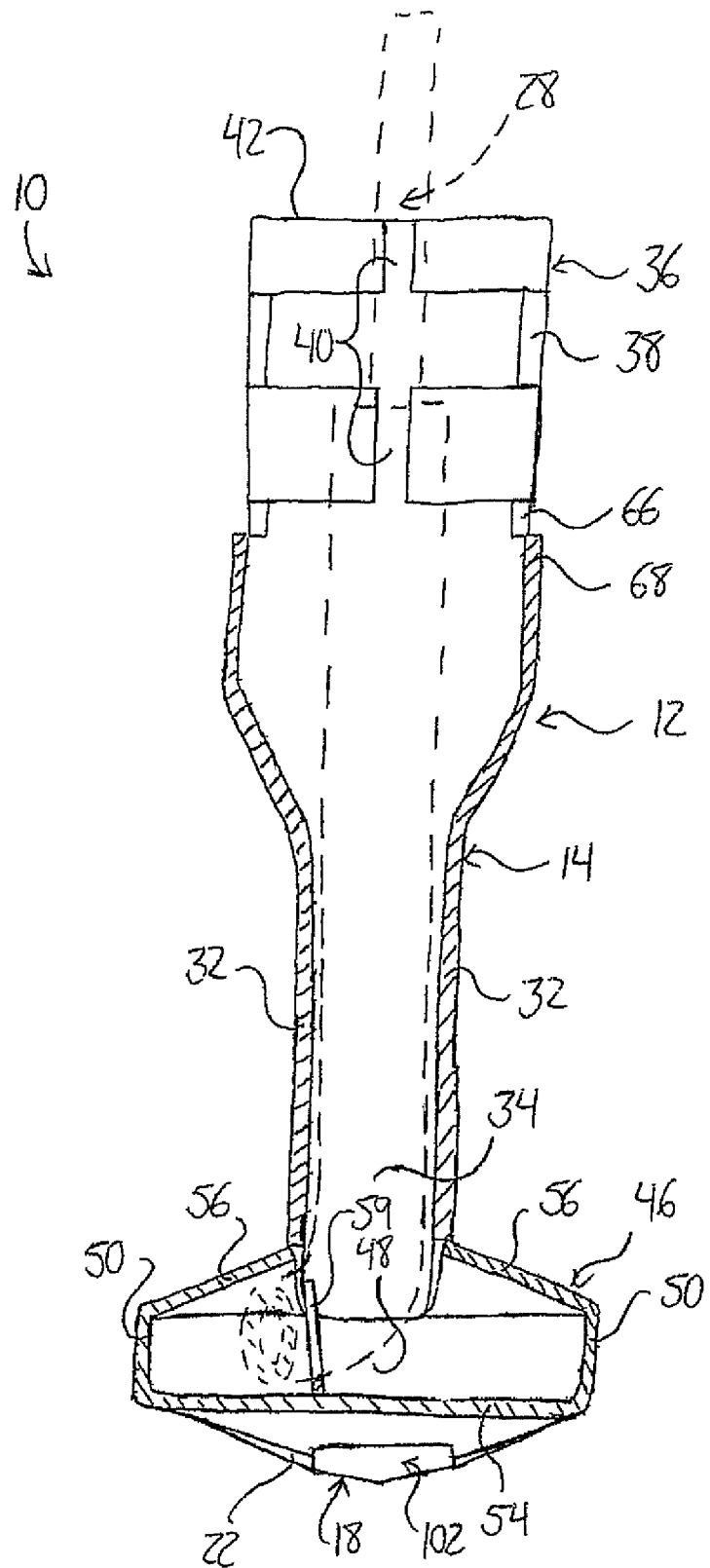
FIG. 6 is a cross sectional view of the opener of FIG. 4 as taken along line VI-VI thereof with a top cover of the opener removed.

Seed and fertilizer are delivered through separate passages 26, 28 formed in the first embodiment by the delivery portion's hollow interior and a bent tube passing therethrough, as shown in FIGS. 5 and 6. The passages 26, 28 extend from inlets at a top end of the opener to outlets 26a, 28a formed a short height above the bottom of the opener on opposite sides of the central body 12 so as to deliver seed and fertilizer to opposite ends of the seed shelf formed by the furrow. In the illustrated embodiments, the outlets are positioned forward of the rear edge upper portion 17 at which the central body 12 is adapted for connection to the C-shank so that seed and fertilizer is released into the furrow before the soil displaced thereby is able to close back in behind the shank being pulled past the displaced soil. Tungsten carbide inserts are installed along the front of the otherwise steel opener on opposite sides of the central body 12 to increase the opener's durability and reduce or prevent wear or damage to the steel components themselves. The point or tip 24 of the opener is similarly defined by a tungsten carbide insert to protect the lowermost point on the ground engaging portion 18 of the opener.

In the figures, the opener 10 is shown generally in the position in which it is to be used when installed on a seeder or drill, that is, with the leading or forward edges of the opener situated in a common horizontal cutting plane along which the opener is to be pulled when installed on the seeder or drill for use. The central body 12 is disposed in a central vertical plane generally defining a plane of symmetry for elements of the opener common to both sides thereof, the width of the central body 12 being measured perpendicularly across the central vertical plane and being significantly less that the central body's dimensions measured horizontally and vertically along this vertical plane such that front, rear, top and bottom boundaries or perimeter sections of the central body 12 in this vertical plane may be thought of as being defined by ends or edges of the central body, which are herein referred to as such due to their small dimensions in the width or transverse direction of the opener through the vertical plane relative to the dimension of the laterally facing sides of the central body 12 along the central vertical plane. A forward working direction in which the opener is to be pulled can thus generally be thought of as extending along the intersection of the horizontal cutting plane and the central vertical plane from the opener's point 24 away from the rest of the opener, or other directions parallel to this, for example a horizontal distance from a rear end of the central body to a forward end thereof in the central vertical plane.

The laterally facing sides 32 of the hollow delivery portion 14 of the central body are defined on opposite sides of the central vertical plane by a contoured steel plate that also defines a vertically oriented curved front edge 34 of the hollow delivery portion curving 180 degrees about a vertical axis to integrally connect the lateral sides 32 over their full height. This curved front edge 34 extends upward past the lateral sides 32, where, with the same arcuate curvature, it extends through nearly a full 360 degrees about the same vertical axis to define a seed tube 36 projecting upward from the delivery portion 14 of the central body 12 over an open top end thereof defined between the lateral sides 32. At a distance above the lateral sides 32 of the delivery portion 14, a seed hose clamping slot 38 is defined in the seed tube wall to extend therethrough over an approximately 180 degree span therearound at a position opposite the curved front edge 34 and passing through a vertical slot 40 left by the slightly less than 360 degree periphery of the seed tube 36. The seed tube 36 has a diameter suitable to receive the free discharge end of a seed hose of the seeder or drill through the seed tube's open top end 42. With a seed hose so inserted, the seed tube 36 closes nearly fully around the seed hose above and below the seed hose clamping slot 38. A hose clamp previously fitted around the seed tube 36 or seed hose is positioned around the seed tube 36 at the seed hose clamping slot 38 and tightened around the seed hose through this slot to clamp the seed hose in place against the curved front edge 34 of the seed tube 36.

Figure 4:
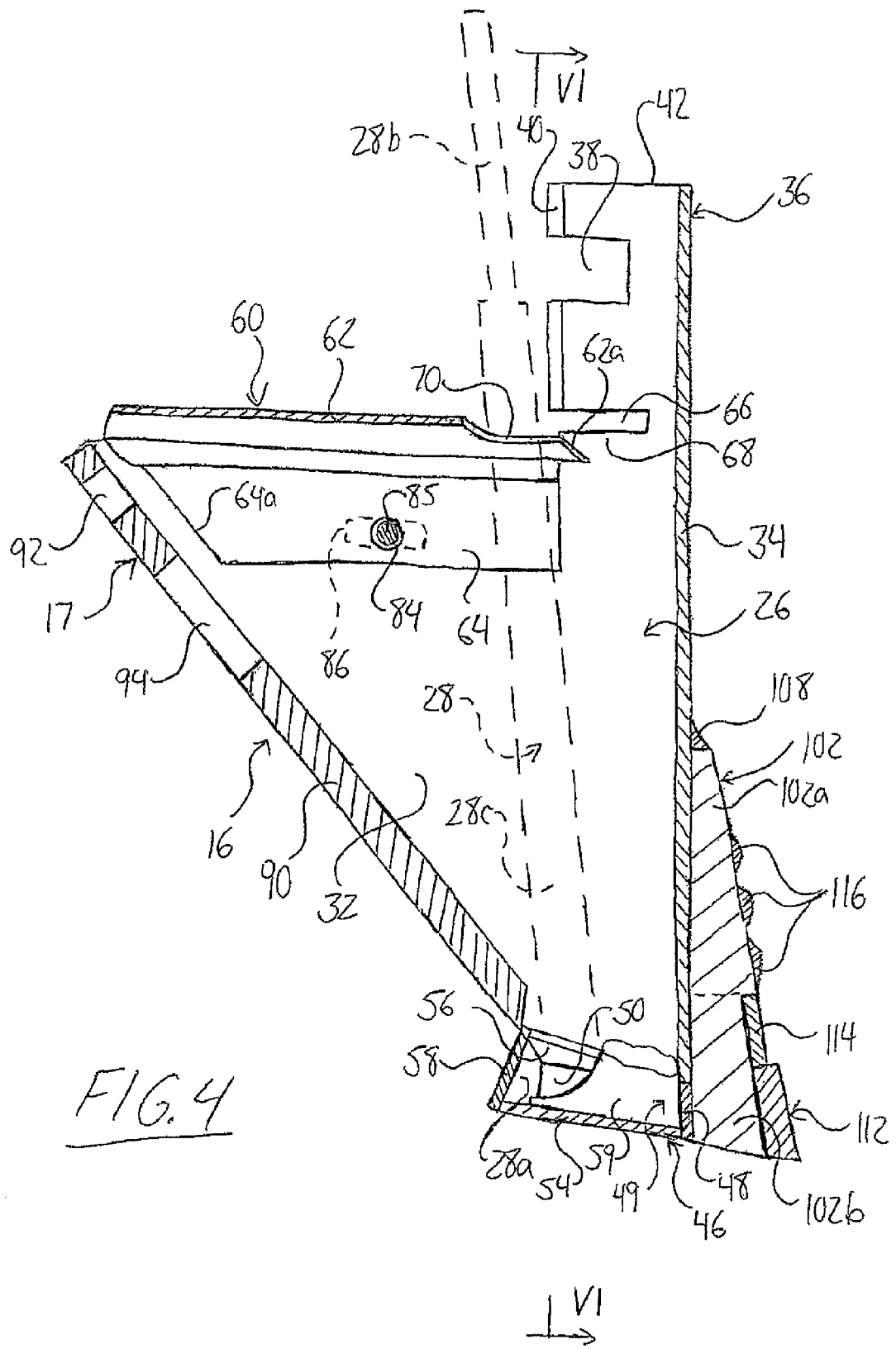
FIG. 4 is a cross sectional view of the opener of FIG. 3 as taken along line IV-IV thereof with a fertilizer tube of the opener removed but shown in broken lines for illustration.

With reference to FIGS. 4 and 5, a portion of the hollow interior defined between the lateral sides 32 of the hollow delivery portion 14 directly beneath the seed tube 36 immediately behind the curved front edge 34 defines a generally vertical seed channel or passage 26. Immediately rearward of the empty seed passage 26 is the fertilizer tube 28, which has outer cross sectional dimensions sufficient to fully span from one of the lateral side walls 32 of the hollow portion 14 of the central body 12 to the other, such that the exterior surface of the fertilizer tube 28 thus forms a rear wall or boundary of the seed passage 26 at a side thereof opposite the hollow portion's front edge 34. In the first embodiment, the fertilizer tube is made up of a metal tube 28b having an insulation layer 28c wrapped thereabout in a known manner for use with on a double shooting seeder or drill using anhydrous ammonia fertilizer. Foam or rubber materials may be used for such insulation purposes, for example by fitting of a rubber air hose over the metal fertilizer tubing. The seed tube 36 projecting upward from the central body 12 at the open top of the hollow delivery portion 14 thus defines a seed inlet through which seed delivered through the seed hose of the seeder or drill passes into the seed channel 26 defined in the hollow interior of the delivery portion by the lateral sides 32 and curved front edge 34 of the central body's hollow portion, and the front side of the fertilizer tube's exterior insulation layer.

With reference to FIGS. 3 to 6, an outlet chamber 46 is mounted beneath the hollow delivery portion 14 of the central body in a position beneath the seed channel 26. The outlet chamber 46 features a curved vertical front wall 48 positioned beneath the front edge 32 of the hollow delivery portion 14 in general vertical alignment therewith to define a curved front portion 49 of the outlet chamber's hollow interior. Curved side walls 50 of the outlet chamber 46 extend integrally rearward from this curved front portion of the chamber in a diverging manner widening the chamber in the rearward direction. A bottom plate 54 of the outlet chamber 46 extends between the side walls 50 below the seed channel 26 to connect them at their bottom ends and define a floor or bottom of the chamber 46. On each side of the central body 12, a cover plate 56 projects laterally outward therefrom directly over the bottom plate 54 to the respective side wall 50, sloping downward in the forward and laterally outward directions, thereby defining a cover or top of the outlet chamber 46 at the portions thereof not directly beneath the hollow interior of the central body's hollow portion 14. The top of the outlet chamber 46 is left open between the laterally facing side walls 32 of the hollow delivery portion 14 of the central body 12 so that the open bottom of the seed channel 26 communicates with the open top of the seed outlet chamber 46 and the fertilizer tube depends downward into the chamber 46 from the interior of the central body's hollow portion 14 thereabove at a distance rearward from the curved front edge thereof.

A rear end of the outlet chamber 26 has a rear wall 58 positioned beneath and spanning between the lateral side walls 32 of the hollow delivery portion 14 of the central body 12 at the rear of the outlet chamber 26. On opposite sides of the rear wall 58, the rear end of the outlet chamber 46 is left open between the respective side edge of this rear wall 58 and the respective side wall 50 of the outlet chamber 46, this opening defining a respective one of the seed and fertilizer outlets 26a, 28a. A rear edge 56a of each cover plate 56 defining an upper boundary of the respective outlet 26a, 28a slopes forwardly as it extends laterally outward from the respective side wall 32 of the central body 12 to connect to the respective chamber side wall 50 at a rear end 50a thereof. A rear edge of the flat bottom plate 54 of the outlet chamber 46 defining lower boundaries of the outlets 26a, 28a has three linearly extending sections sloped relative to one another. A first central section 56a is perpendicular to the central vertical plane of the opener and extends past the respective side edge of the chamber's rear wall 58 from this plane on each side thereof, thus ending laterally outward from the central body 12. Two end sections 56b of the bottom plate's rear edge are disposed at opposite ends of the central section 56a, each sloping obliquely forward therefrom to connect to the respective chamber side wall 50 at the rear end thereof. This angling of the outlets' boundaries results in each outlet 26*a*, 28*a* being angled out of a plane perpendicular to the central vertical plane such that each outlet faces not only rearwardly, but also slightly laterally outward away from the central body 12. The axes about which the two outlets 26*a*, 28*a* open are not parallel with one another or with the forward working direction, but rather diverge away from one another in a rearward direction opposite the forward working direction, diverging symmetrically on opposite sides of the central vertical plane. In other words, each outlet opening 26*a*, 28*a* is angled to give the material discharged therefrom rearward and laterally outward components of motion to encourage better separation of seed and fertilizer released from the two outlets 26*a* in the transverse direction. This way, not only are the seed and fertilizer discharged on separate sides of the opener, but each is discharged from the opener with a laterally outward directed component of motion to further improve seed and fertilizer separation.

With reference to FIG. 4, the fertilizer tube 28 depends downward into the outlet chamber 46 from within the hollow portion 14 of the central body 12 at a rear end of the chamber interior up against the rear wall 58 thereof. Here the fertilizer tube 28 is bent, curving to extend along the chamber floor defined by the upper surface of the bottom plate 54 and project outward from the chamber 46 through the fertilizer outlet opening 28*a* along an axis having rearward and laterally outward directional components due to the angling of the outlet opening 28*a* described herein above. In the first embodiment, a discharge end of the fertilizer tube 28 is not axially aligned with the fertilizer outlet opening, the bent fertilizer tube 28 instead projecting through this opening 28*a* in a direction having a greater lateral component than the axis of the opening 28*a* relative to the central vertical plane of the opener, this lateral component exceeding the directional component of the tube's discharge end axis in the rearward direction opposite that of the forward working direction.

With reference to FIGS. 4 and 5, a barrier or divider wall 59 is positioned within the outlet chamber 46 to divide the interior of the chamber 46 into two sections, each having a respective one of the seed and fertilizer outlets 26*a*, 28*a* defined thereat. The divider wall 59 has a height spanning upward from the bottom panel 54 of the chamber upward to the open top thereof between the lateral side walls 32 of the hollow portion 14 of the central body 12 for connection to the respective side wall 32 on the fertilizer outlet side of the central body 12. The divider wall 59 extends from the front wall 48 of the outlet chamber rearward toward the rear wall 58 thereopposite. An upper rear corner of the divider wall 59 is arcuately notched away so that the divider wall 59 only spans fully between the chamber bottom plate 54 and the hollow portion side wall 32 over approximately half of the divider wall's length from the chamber front wall 48 rearward. The notch gives the divider wall 59 an arcuate edge that faces concavely rearward and upward inside the chamber 46 and spans downward from the respective lateral side wall 32 at the open top of the chamber 46 to the rearmost end of the divider wall 59, where the notch decreases the height of the divider wall 59 to nearly zero. The arcuate edge of the divider wall 59 forms a cradle for passage of the fertilizer tube 28 over the plate toward the fertilizer outlet 28*a*, the divider wall 59 and the tube cooperating to close off the section of the chamber on the fertilizer outlet side of the divider wall from the other section on the seed outlet side.

During operation, with the first embodiment opener 10 installed on a shank carried on a mobile frame of a seeder or drill and a seed hose of the drill's seed delivery system inserted into the seed tube 36 of the opener 10, seed is delivered downward through the seed tube 36 and the seed channel 26 of the delivery portion 14 into the outlet chamber 46 for subsequent discharge through the seed outlet 26*a* on the respective single side of the opener's central body 12 onto the seed shelf proximate a respective side thereof. The divider wall 59 forms a barrier closing off the open bottom of the seed channel 26 and the seed outlet portion of the chamber's interior communicating therewith, so that the seed falling through the seed channel into the outlet chamber 46 is prevented from exiting through the fertilizer outlet. It will be appreciated that it may be possible to form the divider wall integrally with the outlet chamber or the central body of the opener by molding the elements into place using casting techniques.

A removable top cover 60 closes the open top end of the of the hollow delivery portion 14 of the central body 12 immediately behind the fertilizer tube 28 that projects upward from this top end at a position immediately behind the seed tube. The cover 60 extends rearward from the fertilizer tube 28 to the rear end 16 of the central body 12, as defined by the rear end of the hollow delivery portion 14 thereof, sloping downward in the forward working direction from the open top down to the bottom of the seed channel 26. The top cover 60 has a curved or bent top portion 62 arching across the open top from one lateral side 32 of the delivery portion 14 to the other. At each of its sides where it extends along the top edge of a respective one of these side walls 32, the top cover 60 curves back inward beneath itself toward the central vertical plane for a small distance before bending the opposite direction to create a downwardly depending vertical side wall 64. The bent sides of the top cover 60 define ledges 65 projecting laterally outward from the rest of the top cover 60 to sit atop the top edges of the side walls 12 of the hollow delivery portion 14 of the central body 12 to position the cover's side walls 64 inside the hollow delivery portion 14, depending downward along the inner surfaces of the lateral sides 32 thereof.

The rear edge 64*a* of each side wall 64 of the top cover 60 is sloped to extend downward in the forward working direction at the same angle as the rear end 16 of the hollow delivery portion 14. A forward end of the cover's top portion 62 projects past the forward ends of its ledges 65 and side walls 64 on opposite sides of a recess 70 that extends into the forward end of the top portion to accommodate the fertilizer tube 28. The recess 70 has linear sides and a curved end, giving it a U-shaped perimeter of appropriate size to fit against the rear of the fertilizer tube 28 at the insulation layer 28*c* thereof and project the top portion 62 of the cover past the fertilizer tube on both sides thereof. The forward ends 62*a* of the cover's top portion on opposite sides of the insulated fertilizer tube 28 each project to or slightly into the seed channel 26 just below the seed tube 36 between a pair of shoulders 68 of the side walls 32 of the hollow portion 14 of the central body, each shoulder 68 projecting above the rest of this side wall 32 where the seed tube connects thereto. Each end 62*a* arcs to generally match the radius of the seed tube 36 and aligned therewith to accommodate the rear end of the seed hose when inserted into the seed tube 36. The shoulder 68 of the hollow delivery portion 14 of the central body 12 and the rear of the fertilizer tube 28 form a stop past which the top cover 60 cannot pass in the forward working direction due to engagement against the forward ends of the ledges 65 and the curved end of the recess 70 respectively, thus positioning the top cover 60 in a position spanning from the seed tube 36 to the rear end 16 of the central body's hollow delivery portion 14 at the open top thereof, while accommodating passage of the fertilizer tube therethrough. A cover opening 66 left in the rear facing side of the seed tube 36 directly above the shoulders 68 spans the seed tube's full diameter just above at this rear side to accommodate the projecting front ends 62a of the top cover 60 during insertion thereof by lowering of the cover's vertical side walls 64 into the open top of the delivery portion 14 rearward of the seed tube 36 and simultaneous sliding of the cover 60 in the forward direction until the ledges 65 sit atop the delivery portion's side walls 32 with the cover's front end disposed between the shoulders 68 thereof.

A pair of aligned holes 84 is defined horizontally through the top cover's side walls 64 and a corresponding pair of aligned horizontally-extending through-holes 86 is defined in the side walls 32 of the central body's hollow delivery portion 14 so that when the top cover 60 is lowered into place to cover the open top of the delivery portion 14, the two pairs of holes align to allow passage of a bolt 85 through them for fastening with a nut 87 on an opposite side of the central body 12 to lock the top cover 60 place on the central body 12.

It will be appreciated that top covers other than that illustrated and described above may be alternatively used. For example, a molded plastic or rubber top cover may be produced having suitable dimensions to fit exteriorly over the open top of the central body's hollow portion, for example to clip in holes in the lateral side walls 32 like those 84 used to receive the bolt 85 in the illustrated embodiments. Such a cover, fully spanning across the open top of the central body hollow portion 14 for engagement against the lateral side walls 32 at the outer surface rather than top edge thereof. So arranged to fit over the full width of the central body 12, such a cover would better prevent condensation from any uninsulated portion of the fertilizer tube above the central body 12 from dripping down into the hollow portion 14 thereof. A further embodiment described herein below presents one example of a rubber top used to sealingly close off the open top end of the central body's hollow delivery portion to prevent moisture from dripping into the opener body from the anhydrous ammonia tubes extending thereabove.

A rear plate 90 closes off the rear end 16 of the central body's hollow delivery portion 14 rearward and upward from the top of the outlet chamber 46. This rear plate 90 extending along the rearward and downward facing end of the opener's central body 12 generally closes off the rest of the delivery portion's hollow interior except for two fastener openings 92, 94 spaced apart near an upper end of the rear plate 90 rearward of the fertilizer tube 28. The slope of the rear plate 90 and the rear end 16 of the opener's central body, especially at this upper portion 17, approximates that of the lower end portion of a typical C-shank of an agricultural implement so that this upper portion can rest against the shank's lower portion on the forward facing side thereof, with the fastener holes 92, 94 being aligned with the shank's existing fastener elements to facilitate fastening of the opener thereto with the top cover 60 removed for access to the interior side of the fastener holes 92, 94. The lower fastener hole 94 is an elongated slot extending along the sloped rear end 16 to accommodate varying spacing of fastener elements along the shank from one brand of implement to another. It will be appreciated that the central body could be modified for use with other shank styles. For example, a vertical edge-on shank could depend downward between the side walls of the delivery portion at a section thereof left open between the side walls rearward of fertilizer tube channel for fastening to the shank through suitably positioned holes in the side walls 32.

As shown in FIGS. 4 and 5, the ground engaging portion 18 of the opener 10 fixed to the front edge 34 of the hollow delivery portion 14 is solid to provide greater strength at the leading or forward end of the central body 12. This solid portion 18 projects forwardly from the delivery portion 14 over approximately half the full height thereof, sloping downward and forward from the front edge 34 of the delivery portion. This provides a significant span of solid material forward from the hollow delivery portion 14 at the bottom thereof to provide strength, but avoids the creation of a large ledge that would project forward at a position higher up the delivery portion 14 if a right angle arrangement having a straight top and front end were instead used for the solid portion 18. Although such a completely vertical front end may be used with the intention of being able to better cut through trash or debris below its top end during pulling through the soil, weeds, grass and trash may tend to become hung up on the generally horizontal straight cut off or ledge when the opener is lifted. To retain a high degree of smooth passage through crop residue while keeping such hang up issues low, the generally linearly extending sections of the front end of the opener are each oriented at angle greater than fifty degrees, preferably between approximately sixty and ninety degrees, measured in the central vertical plane from the horizontal cutting plane in the forward working direction. Prototypes of the first embodiment opener have been produced with the front surface of the solid portion angled at approximately eighty degrees.

In addition to avoiding the creation of a significant horizontal ledge, the use of one or more non-vertical sloped sections extending downward and forward at the front of the opener acts to encourage the exertion of downward force on the opener as it is pulled through the soil, as the pressure or normal force exerted on these sloped faces or surfaces by the earth above and in front of them as they are pulled through the soil has a vertically downward component. This downward pressure provides a sucking-like action tending to force the opener downward and keep it engaged in the earth at a suitable depth below the surface. The relatively steep angles of the sloped front of the opener thus provide a good balance between the ability to cleanly pass through trash or debris with little hang up thereof and the exertion of some downward force on the opener as it is pulled through the earth.

In the illustrated embodiments the front portion 18 is defined by a single solid part 102 that has been fixed to the hollow portion 14 of the central body at the forward edge 34 thereof by welding, but those of skill in the art will appreciate from the following description that it may have other constructions. For example it may be possible to form these two sections as a single integral piece using casting techniques. The solid part 102 is welded to the curved front edge 34 of the delivery portion 14 to extend upward therealong approximately half way to the shoulders 68 of the delivery portion side walls 32. A narrow horizontal ledge 106 is defined by the top end of the solid part 102, with the corner between this ledge 106 and the front edge 32 of the central body's hollow portion having welding/hardsurfacing 108 thereatop to connect these components create a slope between these surfaces to reduce exposure of a horizontal surface. From the narrow ledge 106, the solid part 102 slopes downward and forward along an upper component 102a thereof, broken lines being used as imaginary boundaries to divide the cross sectional shape of the part. A lower component 102b disposed beneath the upper component 102a and also connecting to the front edge 34 of the central body's hollow delivery portion 14, has its front side recessed slightly rearward from that of the upper part 102a, but sloping downward and forward at approximately the same non-vertical angle relative to the horizontal cutting plane. At a rear end, the bottom of the lower component 102*b* is generally coplanar with the bottom surface of the outlet chamber's bottom plate 54.

At the bottom of the front side of the lower component 102*b* of the solid part 102, a carbide tungsten point 112 is fixed to the front side to define the forwardmost point 24 of the opener and give the point a greater hardness than the steel body on which it is mounted. The carbide point 112 narrows in the forward working direction from an integral flat rectangular base portion 112*a* of the point, which is braze welded to the front side of the solid part's lower component 102*b* in a face-to-face arrangement, to a central narrow rectangular forwardmost surface extending generally parallel to the front side of the solid part's lower component 102*b*. The carbide point 112 also narrows in a downward direction from the integral base portion 112*a* where it extends forward from a lower edge of this rectangular base portion 112, narrowing in the downward direction to a generally horizontal center bottom surface disposed beneath the narrow forwardmost surface. This central bottom surface is symmetrical about the central vertical plane and frustotriangular in shape, narrowing from the front side of the lower component 102*b* of the solid part 102 of the solid portion 18 of the central body beneath the base portion of the carbide point 12 to the truncated end of the surface's frustotriangular shape intersecting and sharing a common width with the forward facing narrow rectangular surface. Each of the front and bottom sides of the carbide point has three flat surfaces: a central surface perpendicular to the central vertical plane, and a pair of outer surfaces on opposite sides thereof converging theretoward; the outer surfaces of the bottom side extending forward from the front side of the lower component 102*b* of the central body 12 and the outer surfaces of the front side extending forward from the side of the point's rectangular base 112*a* opposite its connection to the front side of that lower component 102*b*.

Also braze welded to the front side of the solid part's lower component 102*b* immediately above the carbide point 112 is a flat rectangular tungsten carbide wear plate 114 arranged face-to-face with this front side, having a thickness similar to the rectangular base portion 112*a* of the carbide point 112. This thickness of the carbide wear plate 114 is generally equal to the depth by which the front side of the solid part's lower component 102*b* is recessed back from the front side of the solid part's upper component 102*a*, the carbide wear plate and point substantially filling the full height of this recessed portion of the opener's front side. On the front side of the solid part's upper component 102*a*, just above the lower component 102*b*, three hardsurfacing strips 116 are provided extending across the front side in the transverse direction of the opener in closely spaced proximity to one another along the sloped front side. The carbide wear plate and tip and this hardsurfacing provide an area of improved strength extending upward from the bottom of the opener's front side in this area thereof that must endure the most punishment, for example colliding head-on with rocks disposed in the soil, during pulling of the opener through the earth relative to the otherwise steel structure alone, and in addition allow for repair by re-hardsurfacing to reduce or eliminate the need to instead replace the opener after extended use.

Furrowing members 22 are fixed in place at opposite flat lateral sides 32 of the solid portion 18 of the opener's central body 12 forward of the seed outlet chamber 46 to project laterally outward from opposite sides of the central portion 12 in a rearward direction from near the tip or point 24 formed at the forwardmost and lowermost point of the opener 10. The furrowing members 22 are solid steel pieces secured to the seed outlet chamber 46 along the side walls 50. In a direction perpendicular to the central vertical plane, each furrowing member extends laterally outward from the central body 12 as far as, or slightly farther than, the respective outlet chamber side wall 50, with welding/hardsurfacing connecting the chamber cover plates 56 to the furrowing members along the top front edges of the chambers defined by the intersection of the curved side walls thereof with the cover plates 56. With the furrowing members extending lengthwise generally along the front of the outlet chamber 46, they each project therefrom in the forward working direction to present an upwardly and forwardly facing planar front side or face and a bottom face extending upward and rearward therefrom. The intersection of these faces on each furrowing member defines a horizontal leading edge of the furrowing member extending laterally outward and rearward from a point on the solid portion 18 of the central body proximate the bottom end thereof and the tip mounted thereon to a point at least as far laterally outward from the central body 12 in the transverse direction as the laterally outermost extent of the outlet chamber 46.

A tungsten carbide insert 122 is braze welded at a flat face thereof to the sloped front side or face of each furrowing member 22. In the illustrated embodiments, each insert 122 is a parallelepiped having elongated non-right-angle parallelogram faces interconnected by rectangular joining surfaces perpendicular to these faces and defining a thickness of the insert less than its length and width, which are defined by its faces. Each insert extends lengthwise along and substantially covers the entire front side of the respective furrowing member 22, situating a top edge of the insert's front face substantially flush with the top surface of the respective planar chamber cover 56. The rearward sweeping angle of each furrowing member 22, its sloped front side and its generally parallel ends, the inner one of which is fixed generally flush against the vertical side of the central body's solid portion, gives the front side a parallelogram shape when viewed face on, the inner end of the front side angling rearward along the vertical side of the central body 12 at the wing's inner end. The small angle of the parallelogram face of each insert 122 is chosen to generally match this angle to align therewith, the length of the insert generally matching the length of the furrowing member's front side so that the insert substantially covers the full front side when arranged therealong in aligned orientation therewith. With the inserts so positioned, the cutting edges of the furrowing members are thus defined on each furrowing member 22 by the bottom edge of the exposed forward face of the insert 22 situated forward of the furrowing member's front side by the thickness of the insert. Along the horizontal cutting plane defined by these horizontal cutting edges supported parallel to the leading edges of the furrowing members, the front sides of the furrowing members are positioned slightly rearward of the bottom end of the front side of the solid portion 18 of the central body so that that an axis along which each insert-defined cutting edge 124 extends has a bottom corner of the carbide point's rectangular base 112*a*, on the mounting face thereof at the side nearest the furrowing member in question, lying on it or in close proximity to it. Together with the inner ends of the inserts 122 each having their rear edge generally flush with the inner end of the respective furrowing member, the carbide inserts 122 are thereby kept close to the carbide point 112 in both the horizontal forward working direction and the horizontal transverse direction perpendicular thereto. Like the carbide point 112 and wear plate 114 of the opener's central body 12, the inserts improve the strength of the opener's the furrowing members by using harder carbide in place of the steel the furrowing member bodies to define the horizontal cutting edges.

Figure 2:
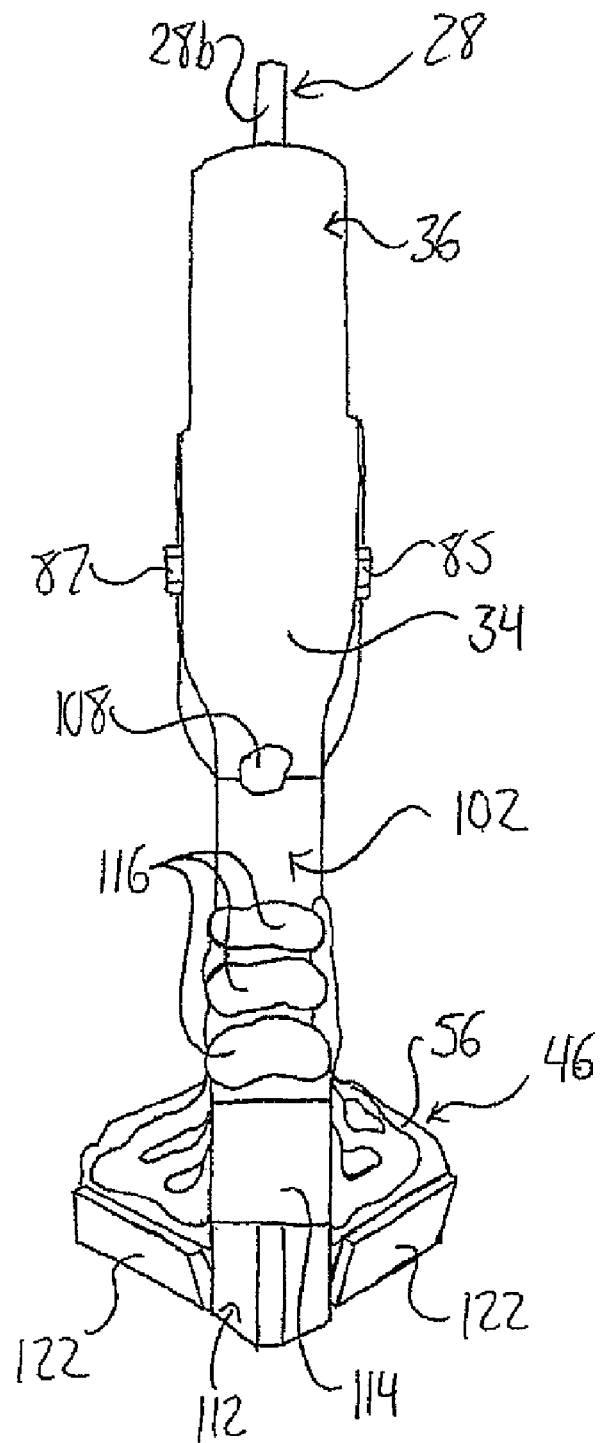
FIG. 2 is a front view of the opener of FIG. 1.
Figure 3:
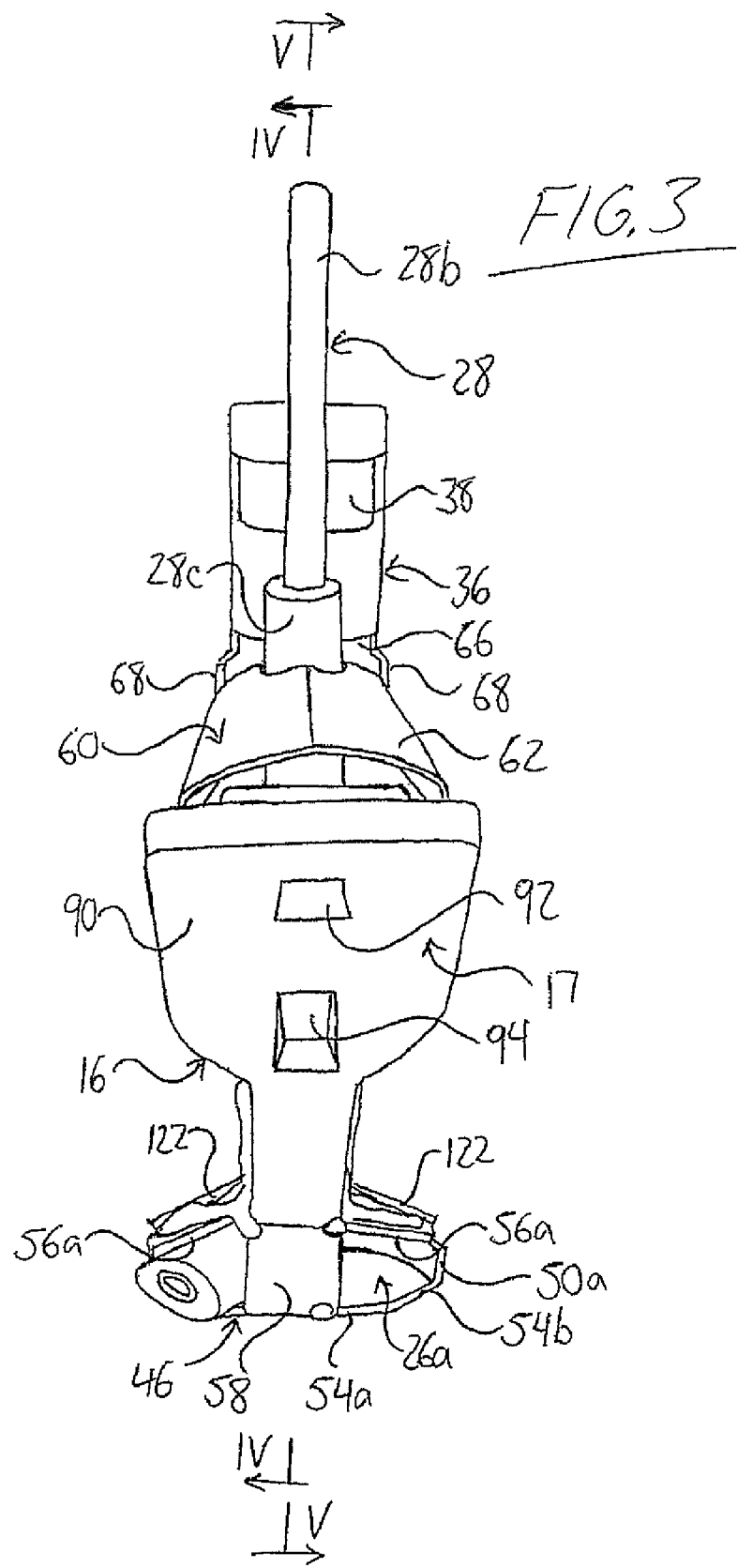
FIG. 3 is a rear view of the opener of FIG. 1.

In the illustrated embodiments, the solid portion 18 of the central body 12 is of a uniform width measured in the transverse direction over its full height, the hollow delivery portion 14 having a matching outside width over a lower portion thereof extending from the seed outlet chamber 46 upward to a horizontal plane at the top of the solid front portion 18. As shown in FIGS. 2, 3 and 5, the side walls 32 of the hollow delivery portion 14 flare laterally outward away from one another above this horizontal plane before returning to vertical orientations to widen its hollow interior at these upper vertical portions of the side walls to accommodate the diameter of a conventional seed delivery hose to be inserted into the seed tube 36. This flared shape allows the central body 12 of the opener 10 to be kept quite narrow over most of the opener's height profile that will be lowered into the ground, thereby keeping resistance to pulling of the central body 12 through the soil correspondingly low and allowing for relatively fast seeding. For example, prototypes of the first embodiment opener described herein above have been produced with a thickness of approximately 2.5 cm at the solid portion 18 of the central body 12.

As shown in the Figures, hardsurfacing may be applied to different external parts of the primarily steel opener structure to improve impact or abrasion resistance. In the illustrated embodiments, hardsurfacing deposits are shown (a) extending along the front side of the central body 12 on the sides thereof adjacent the front end along the upper component 102a of the solid part 102 of the central body's rigid portion 18, interconnecting the three strips of hardsurfacing 116 on this portion of the opener's front end; (b) along the borders formed between the hollow delivery portion 14 of the central body 12 and the solid portion 18 at the central body's vertical sides; (c) fully along the front and rear edges of each of the outlet chamber's cover plates 56 with another strip extending laterally outward from the central body along the cover plate 56 between these other two hardsurfacing strips on the cover plate 56; (d) on the lateral side of the central body's hollow delivery portion 14 along the rear end 16 thereof; (e) vertically upward along each lateral sidewall 32 of the central body's hollow portion 14 between the strips at the front and rear ends 34, 16 thereof; and (f) on each lateral side 32 of the central body 12 connecting the forwardmost strip on the respective outlet chamber cover plate 56 to the respective strip interconnecting the three strips on the opener's front end.

The opener described herein above through cooperation of the coplanar horizontal cutting edges provided by the on the furrowing members and the central body by the inserts and point respectively defines, in operation, a single horizontal seed bed onto which the seed and fertilizer are delivered on opposite sides of the central body with an outward component of motion to ensure maximum separation by placement at opposite ends of the shelf. As shown in the illustrated embodiments, the cutting edges formed at the front of the tip or point's bottom end may be positioned just slightly below the common horizontal plane of the insert cutting edges on opposite sides of the tip during manufacture, as this leading part of the opener may tend to wear relatively quickly. Such a tip may thus form a very shallow trench along the center of the otherwise planar horizontal seed bed on which the seed and fertilizer are delivered to opposite sides or ends during initial use of the opener. As the tip wears with repeated use of the opener, this shallow trench will no longer tend to the form as the bottom of the tip wears into a substantially coplanar arrangement with the insert cutting edges, resulting in a horizontal seed bed of a generally uniform planar structure across its full width. Prototypes of the first embodiment opener produced with a one inch central body width have been tested and found to achieve 2.5 to 4 inches of seed and anhydrous ammonium fertilizer separation, the separation appearing to be somewhat dependent on soil type and moisture.

It will be appreciated that a double shooting opener having fertilizer and seed outlets defined on opposite sides of the mounting body fastenable to the seeder or drill to provide improved seed and fertilizer separation need not necessarily be of the type arranged to deliver seed and fertilizer ahead of the opener's connection to the shank or the type having a vertical or steep front end. Although the first embodiment is illustrated and described for use of anhydrous ammonia, it will be appreciated that a similar arrangement may be used to deliver seed and liquid fertilizer. Such an alternate embodiment may not require the use of insulation fitted over the fertilizer line.

The first embodiment could also be modified for use with granular fertilizer, for example by replacing the relatively narrow anhydrous ammonia fertilizer tube with a tubular conduit having a greater interior cross section sufficient to allow granular flow therethrough and being connectable to a granular fertilizer delivery hose of a seeder or drill. Alternatively, as shown by the second embodiment illustrated in FIGS. 7 to 9, it is possible to produce a central body with hollow interior space divided to define separate passages or channels each leading to a respective one of the seed or fertilizer outlets on opposite sides of the central body rather than relying on passage of a tube or conduit through the interior to facilitate separated flow of two materials through the shared space.

Figure 7:
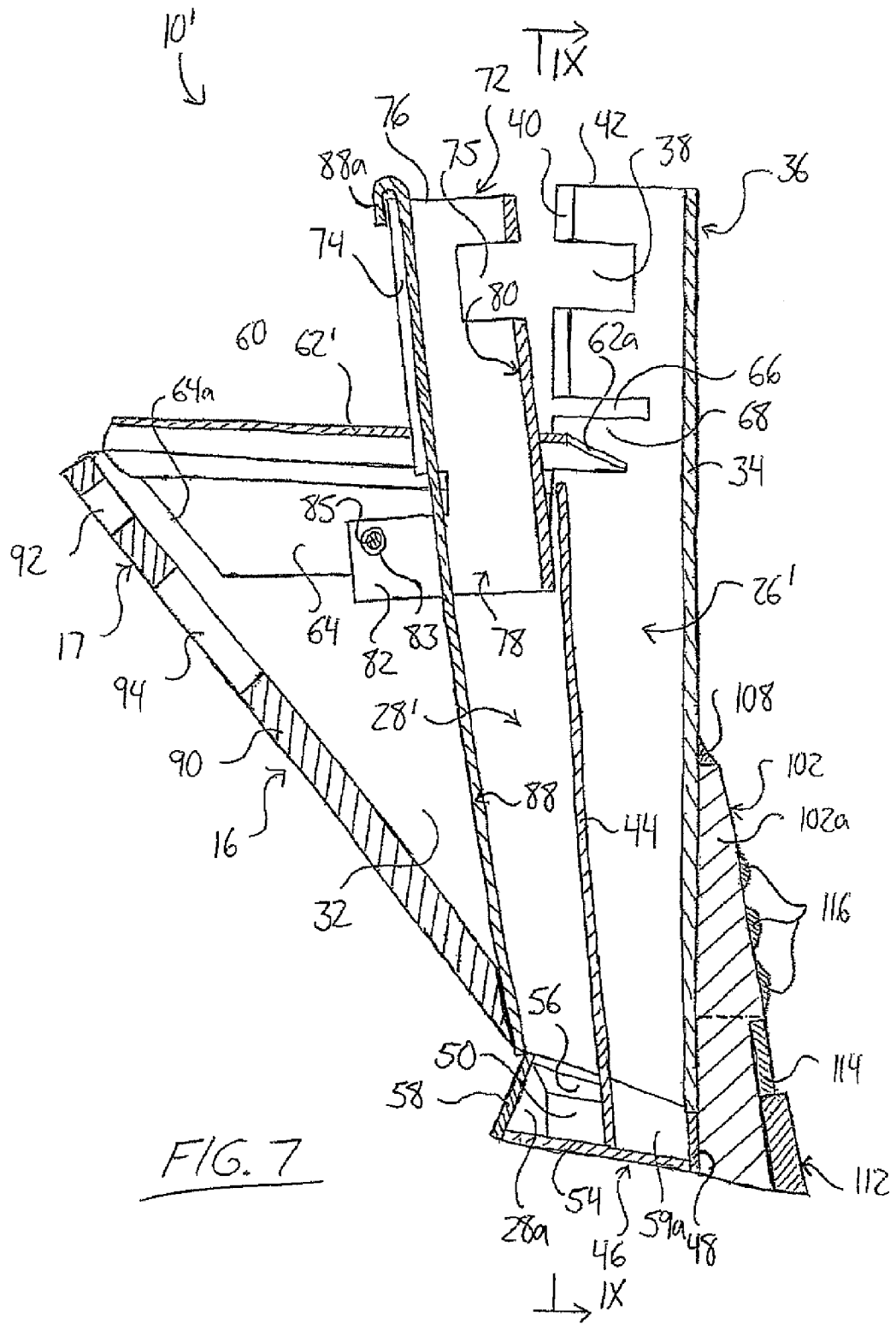
FIG. 7 is a cross sectional view of a second embodiment double shoot opener taken along the same plane as the FIG. 4 cross section of the first embodiment opener.
Figure 8:
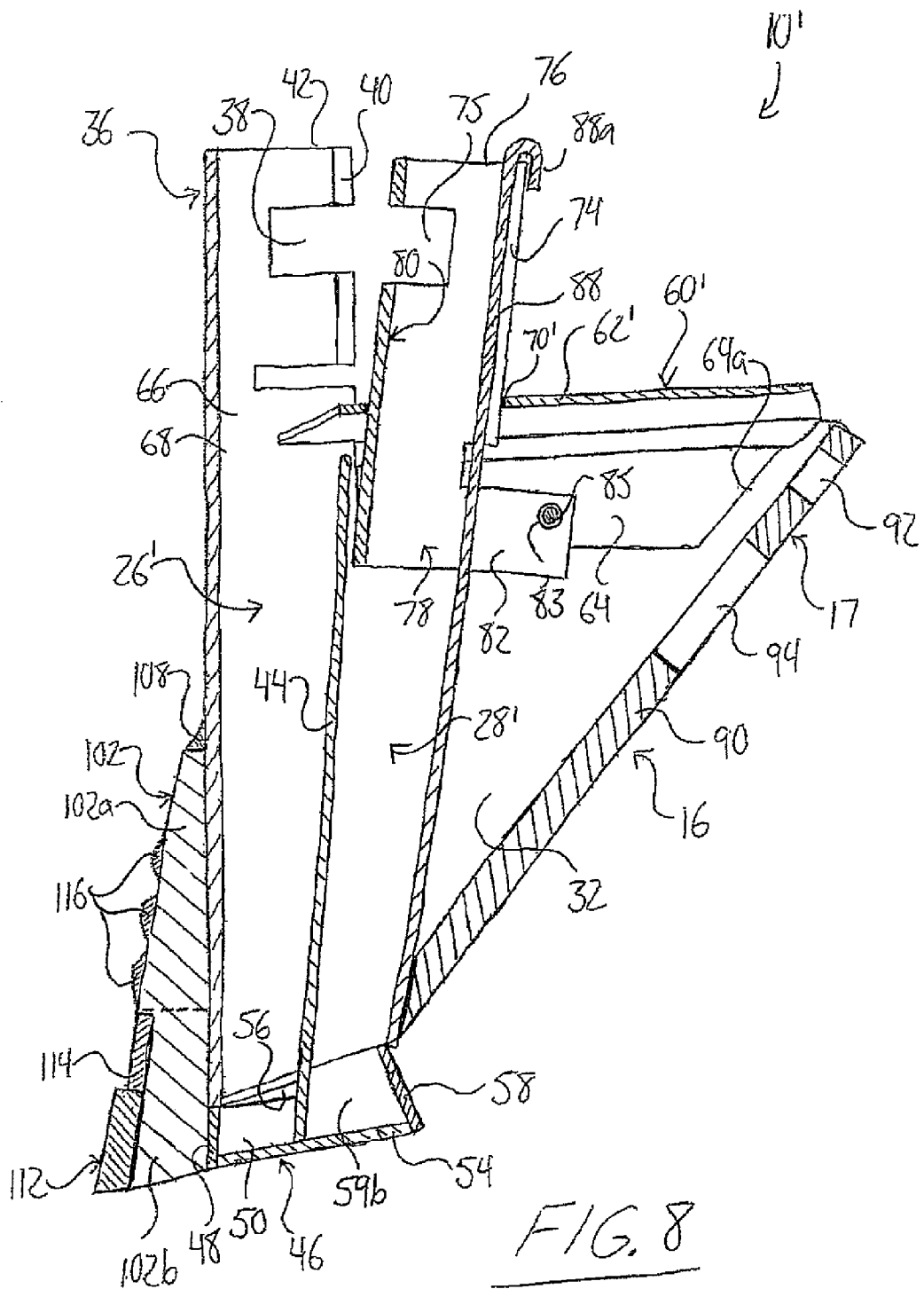
FIG. 8 is a cross sectional view of the opener of FIG. 7 as taken along the same plane as the FIG. 5 cross section of the first embodiment opener.
Figure 9:
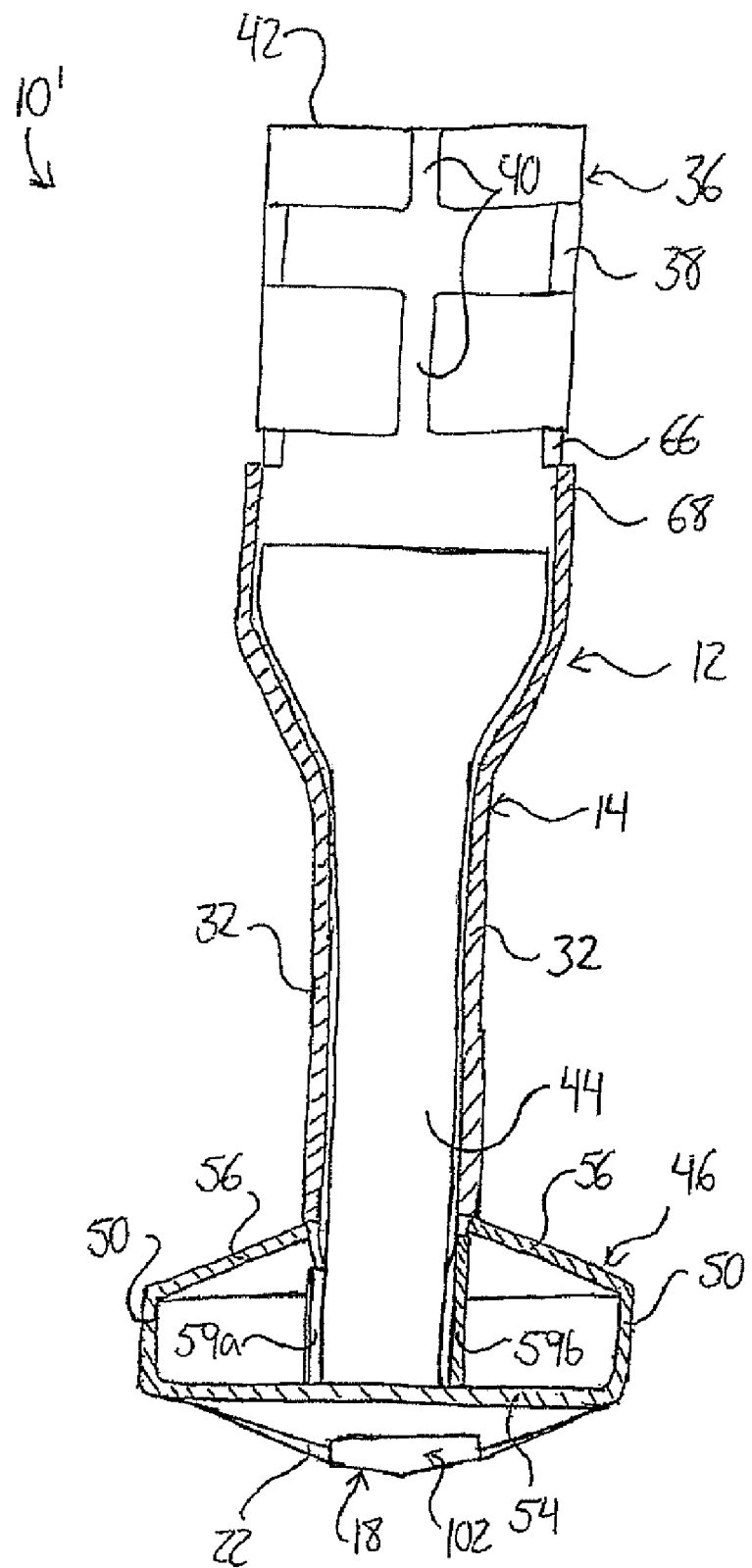
FIG. 9 is a cross sectional view of the opener of FIG. 7 as taken along line IX-IX thereof with a top cover and fertilizer inlet tube of the opener removed.

A second embodiment double shoot opener 10' shown in FIGS. 7 to 9 features the same central body 12 as the first embodiment but differs that the fertilizer passage 28' is not defined by an insulated tube arranged for coupling to an anhydrous ammonia fertilizer delivery system and the rear side or boundary of the seed passage 26' is accordingly not defined by the exterior insulation of such a tube. Instead, extending downward from proximate the bottom of the seed tube 36 and the open top of the delivery portion 14 of the central body 12 is a divider plate 44 projecting downward and slightly forward from proximate a rear side of the seed tube 36 and extending generally fully between the lateral sides 32 of the hollow delivery portion 14 to define a generally vertical seed channel or passage 26' between itself and the curve front edge 32. The seed tube 36 projecting upward from the central body 12 at the open top of the hollow delivery portion 14 again defines a seed inlet, but the rear and front boundaries of the seed and fertilizer passages 26', 28' respectively are defined by the divider plate 44, not by an insulation layer disposed around a bent fertilizer tube.

A circular through-hole 70' in the top portion 62' of the top cover 60' replaces the recess 70 of the first embodiment, and is positioned rearward from the front end of 62a' of the top cover 60' in a position just rearward of the seed tube 36. A fertilizer inlet tube 72 passes downwardly through this hole 70' in the top cover 60' into the hollow interior of the central body's delivery portion 14 just rearward of the seed tube 36. Like the seed tube, the fertilizer inlet tube 72 is formed of plate material bent through nearly 360 degrees to form a nearly closed cylindrical structure, leaving a narrow gap 74 in its circumference extending along the nearly vertical cylindrical-like fertilizer inlet tube 72 on its rearward-facing side, but is not an integral part of the opener's central body 12. A fertilizer hose clamping slot 75 is defined in the fertilizer inlet tube 72 proximate the open top 76 thereof, extending through its peripheral wall over an approximately 180 degree span thereabout at a forward facing side of the fertilizer inlet tube 72 opposite the gap or vertical slot 74. The granular fertilizer hose of a seeder or drill can therefore be clamped in place in the same manner as described herein above for the seed hose, but against the rear side of the fertilizer inlet tube 72 due to the positioning of the fertilizer hose clamping slot 75 in the front side thereof.

A bottom portion 78 of the fertilizer inlet tube 72 situated beneath the top cover 60' within the hollow interior of the central body's delivery portion 14 between the side walls 32 thereof arcs only through 180 degrees, defining a U-shaped portion curving about the same axis as the generally cylindrically shaped upper portion 80 of the fertilizer inlet tube 72. The U-shaped bottom portion 78 defines a pair of parallel legs 82 projecting rearward from the upper portion 80 therebelow at opposite sides thereof. These legs 82 are positioned parallel to and between the top cover's side walls 64 and the side walls 32 of the central body's hollow delivery portion 14. Aligned holes 83 defined horizontally through the legs 82 are positioned to align with the holes 84 defined horizontally through the top cover's side walls 64 and the aligned holes 86 in the side walls 32 of the central body's hollow delivery portion 14, so that when the top cover 60' is lowered into place to cover the open top of the delivery portion 14, the three pairs of holes align to allow passage of the bolt 85 through them for fastening with the nut 87 to lock the top cover 60' in place just as in the first embodiment, but with the fertilizer inlet tube 72 being thereby being locked in place as well.

Granular fertilizer delivered to the fertilizer inlet tube 72 through a respective delivery hose of a seeder or drill to fall through the open bottom end of the fertilizer inlet tube 72 defined between the legs of its U-shaped portion 78, is encouraged downward along a generally straight path sloping slightly forward toward the open top of the outlet chamber 46 immediately in front of the rear wall 58 thereof by a guide bar 88 shown in FIGS. 7 and 8. A top end of the guide bar 88 is bent through 180 degrees to define a U-shaped hook 88a that engages around the circumferential edge of the fertilizer inlet tube's open top end 76. From this hook end 88a, the guide bar 88 depends downward and slightly forward through the fertilizer tube 72 against the interior surfaces of its rear side to extend substantially fully down to where the rear plate 90 closing off the rear end 16 of the central body's hollow delivery portion 14 extends rearward and upward away from the outlet chamber 46. The guide bar 88 is of a width sufficient to cover a significant portion of, if not the entire, width of the delivery portion's hollow interior, defined by the distance between the side walls 32 thereof perpendicular to the central vertical plane, to block granular fertilizer from passing rearward past it during delivery through the fertilizer inlet tube 72. The fertilizer inlet tube 72 projecting upward from the central body 12 at the open top of the hollow delivery portion 14 thus defines a fertilizer inlet through which granular fertilizer delivered through the fertilizer hose of the seeder or drill passes into the enclosed fertilizer channel 28 defined in the hollow interior of the delivery portion by the lateral sides 32, guide bar 88, and divider plate 44.

As shown in FIGS. 7 to 9, the divider plate 44 of the second embodiment opener 10' extends fully downward to the bottom plate 54 of the outlet chamber 46 so that the open bottoms of the seed and fertilizer channels 26', 28' open downward into outlet chamber separately on opposite sides of the divider plate 44. The divider wall of the first embodiment opener is replaced with front and rear divider walls 59a, 59b in the second embodiment opener 10' to prevent mixing of the seed and granular fertilizer in the outlet chamber and ensure that each is discharged therefrom through its respective one of the seed and fertilizer outlets 26a, 28a. With reference to FIGS. 7 and 9, the front divider wall 59a has a height spanning upward from the bottom panel 54 of the chamber upward to the open top thereof proximate a respective one of the lateral side walls 32 of the hollow portion 14 of the central body 12 for connection to this respective side wall on the fertilizer outlet side of the central body 12. The front divider wall 59a extends from the front wall 48 of the outlet chamber rearward to the divider plate 44 situated approximately half way between the front and rear walls 48, 58 of the outlet chamber 46 so that seed descending into the outlet chamber 46 from the seed channel 26' can only pass by the divider plate on the seed outlet side of the chamber 46. With reference to FIGS. 8 and 9, the rear divider wall 59b has a height spanning upward from the bottom panel 54 of the chamber upward to the open top thereof at an opposite respective one of the lateral side walls 32 of the hollow portion 14 of the central body 12 for connection to this side wall on the seed outlet side of the central body 12. The rear divider wall 59b extends from the divider plate 44 rearward to the rear wall 58 of the outlet chamber so that fertilizer descending into the outlet chamber 46 from the fertilizer channel 28' can only pass by the divider rear wall 58 through the fertilizer outlet 28a.

The second embodiment opener 10' thus differs from that of the first embodiment in that the interior of the central body's hollow portion 14 is divided into separate portions positioned over front and rear portions of the outlet chamber 46 below it so as to define two channels each emptying into a respective separate portion of the divided outlet chamber, thereby forming two enclosed chutes for separate delivery of seed and granular fertilizer to the respective outlets without mixing for discharge to their respective side of the opener's central body 12 during operation to ensure adequate fertilizer and seed spacing within the single seed bed formed by the double shooting opener.

It will be appreciated that an opener according to the present invention may be produced using different techniques. For example production of the second embodiment opener may involve welding together initially separate pieces defining the solid portion of the central body 18, the hollow portion 14 of the central body, the divider plate 44, the outlet chamber 46 and each of the divider walls 59a, 59b. Alternatively, some of these components may be produced as integral pieces requiring final assembly of fewer components.

Figure 10:
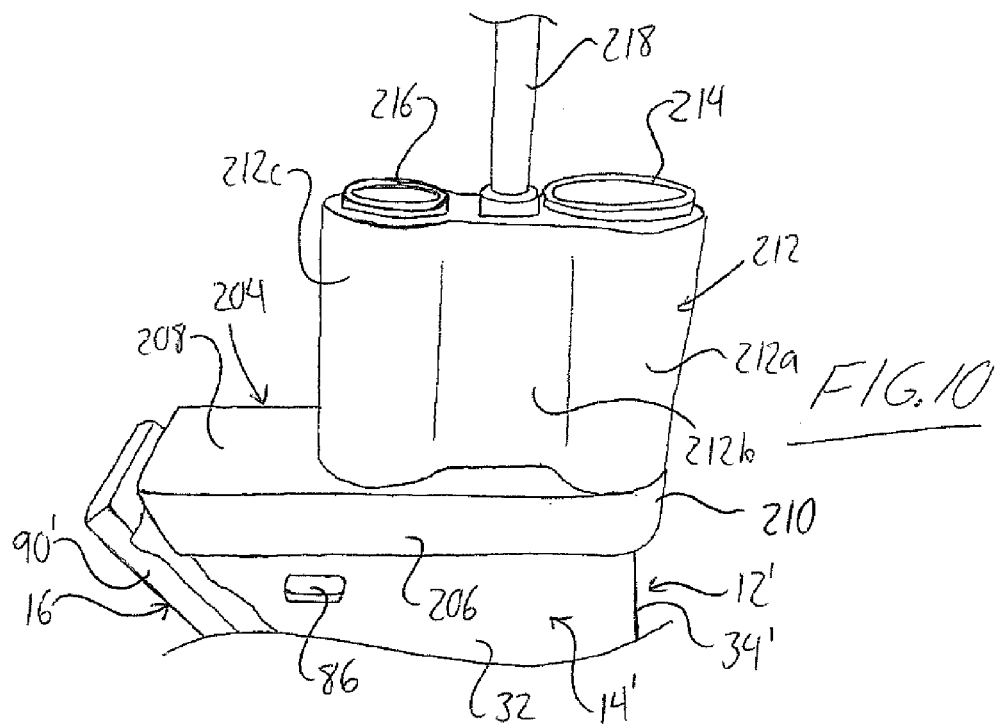
FIG. 10 is a partial top side perspective view of a third embodiment opener having a waterproof top cover shown with a mounting component thereof removed for illustration.
Figure 11:
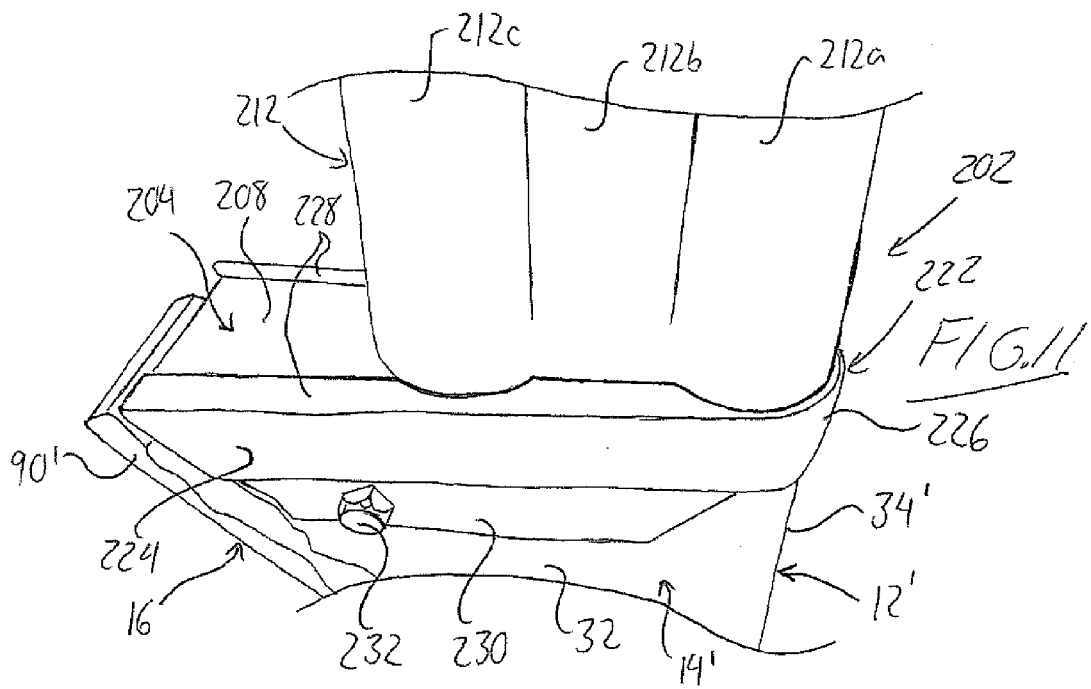
FIG. 11 is a partial top side perspective view of the opener of FIG. 10 with the mounting cover component thereof installed.
Figure 12:
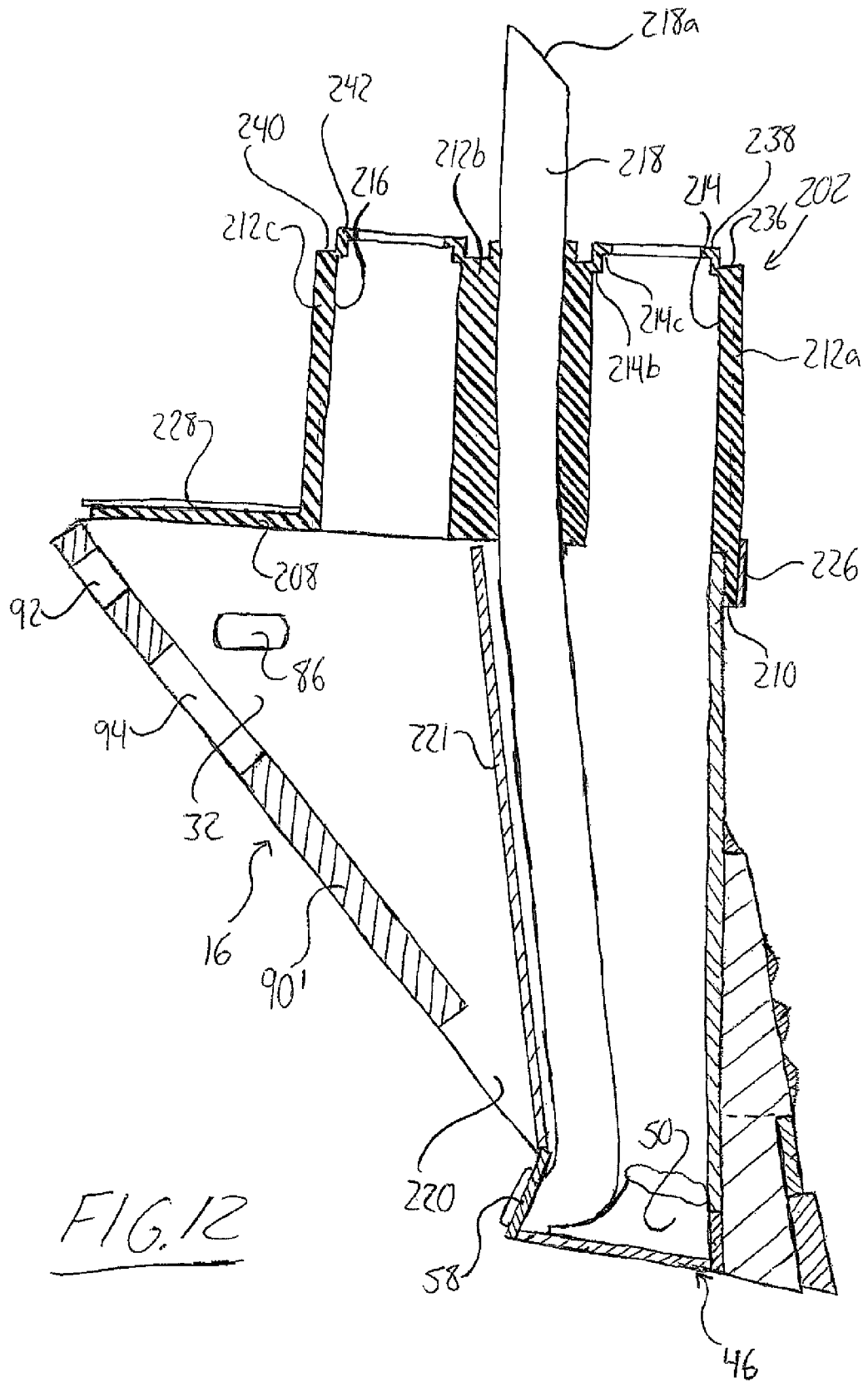
FIG. 12 is a cross sectional view of the opener of FIG. 10 taken along the same plane as the FIG. 4 cross section of the first embodiment opener.

FIGS. 10 to 12 show a third embodiment opener 200 wherein the seed tube 36' is not an integral part of the central body 12', but is instead incorporated into a liquid impervious cover assembly 202 sealing off the open top end of delivery portion 14 of the central body 12. A rubber closure member 204 of the cover assembly features a pair of vertical side walls 206 spaced horizontally apart and interconnected by a horizontal top wall 208. The width of the top wall is sufficient to just span across the open top of the central body delivery portion 14' and seat upon the top edges of the central body side walls 32 with the closure member side walls 206 depending downward from these top edges at the outer surfaces of the central body side walls 32. A curved front wall portion 210 of the closure member 204 is equal in height to the closure member side walls 206 and forms an integral connection thereof around the curved front edge 34 of the opener's central body 12 at the top of this front edge. In this embodiment, where the seed tube is not integral with the central body 12', the front edge 34' of the central body may terminate at an upper end thereof equal with the upper ends of the central body side walls 32.

A tube-supporting block 212 of the closure member 204 integrally projects vertically upward from the top wall 208 thereof and includes three side-by-side sections 212a, 212b, 212c arranged from front to back along the top of the opener's central body 12' when the walls of the closure member are fitted thereover. A seed inlet section 212a at the front of the closure member 204 and a granular fertilizer section 212c at the rear of the closure member 204 have outer peripheries of generally circular cylindrical shape projecting vertically upward from the closure member top wall 208, while a fluid fertilizer section 212b of the block 212 is disposed integrally between the seed and granular fertilizer sections 212a, 212c and is generally rectangular in horizontal cross-section. As shown in FIG. 10, the seed section 212a has a front half of its cylindrical outer periphery generally flush with the curved front wall 210 of the closure member 204 arcuately interconnecting the side walls 206 thereof.

A vertical bore 214 of circular horizontal cross section passes vertically through the block 212 concentrically through the seed section 212a thereof to extend downward through the closure member top wall 208 integral therewith and thereby communicate with the hollow interior of the central body's delivery portion 14. Likewise, another vertical bore of circular horizontal cross section passes vertically through the block 212 concentrically through the granular fertilizer section 212c thereof to extend downward through the closure member top wall 208 integral therewith and thereby communicate with the hollow interior of the central body's delivery portion 14. A bore of smaller circular cross section passes downwardly through the middle fluid fertilizer section 212b and has a fluid fertilizer tube 218 of outer diameter equal to the bore diameter fitted in the bore to pass through the rubber closure member 204 from thereabove down into the hollow interior of the delivery portion 14' of the opener's central body 12'. As in the first embodiment, this fertilizer tube 218 extends downward to the outlet chamber 46 at the bottom of the opener's central body to slightly project through one of the two rear openings thereof laterally outward from the central body, thereby defining an outlet for fluid fertilizer, such as liquid fertilizer or anhydrous ammonia, to be delivered through the fluid fertilizer tube 28 by an appropriate source system on the seeding implement.

The bore 214 in the front seed section 212a of the closure member block 212 defines a seed tube with its forwardmost extent seated atop or adjacent the curved front edge 34' of the opener's central body 12' so that this seed tube forms a seed inlet projecting upward from the central body 12' adjacent the front end thereof between the central body side walls 32. The seed tube again has a diameter suitable to receive the free discharge end of a seed hose of the seeder or drill through the seed tube's open top end. With a seed hose so inserted into the front bore 214 of the closure member inlet block 212, this rubber block closes fully around the end of the seed hose. Just as in the first embodiment, seed passing through the seed tube from the seed hose falls down through the hollow interior of the central body's delivery portion 14 into the outlet chamber 46 on the side thereof opposite that to which the fluid fertilizer tube 218 projects so that seed exits rearwardly on the opposite side of the central body.

The bore 216 in the rear granular fertilizer section 212c of the closure member block 212 defines a granular fertilizer tube forming a granular fertilizer inlet projecting upward from the central body 12' rearward of the seed and fluid fertilizer inlets and between the central body side walls 32. The granular fertilizer bore 216 has a diameter suitable to receive the free discharge end of a granular fertilizer hose of the seeder or drill through the tube's open top end. With a granular fertilizer hose so inserted into this rear bore 216 of the closure member inlet block 212, this rubber block 212 closes fully around the end of the granular fertilizer hose.

Granular fertilizer passing through the granular fertilizer tube from the granular fertilizer hose falls down through the hollow interior of the central body's delivery portion 14 behind the fluid fertilizer tube 218. The rear plate 90' closing off the rear end 16 of the opener's central body 12 in this embodiment ends at a distance along this sloped rear end upward and rearward of the rear end of the outlet chamber 46, leaving an opening 220 between the outlet chamber's rear wall 58 and the lower end of the rear plate 90 between the central body side walls 32. This opening 220 forms a granular fertilizer outlet situated centrally across the opener between the seed and fluid fertilizer outlets laterally outward from the central body.

In the embodiment shown in FIG. 12, the fluid fertilizer tube 218 does not quite extend the full width of the hollow interior between the side walls 32 of the central body, and so a divider plate 221 is fixed to the side walls 32 to span therebetween behind the fluid fertilizer tube 218 from just below the top wall 208 of the closure member 204 down to the rear wall 58 of the outlet chamber 46. With the top end of the divider plate 221 situated at or just ahead of the forwardmost extent of the granular fertilizer tube formed by the rearmost bore 216 of the closure member inlet block 212, the divider plate 221 blocks granular fertilizer from contact with the fluid fertilizer tube 218, dividing the portion of the central body's hollow interior rearward of the divider plate into a separate enclosure forming part of a granular fertilizer passage extending form the granular fertilizer inlet at the top end of the rear section 212c of the inlet block 212 to the central outlet 220 just above and rearward of the outlet chamber 46.

This granular fertilizer outlet disposed between and immediately upward and rearward from the other two outlets allows use of the opener in a triple shoot configuration, where seed and fluid fertilizer are delivered at lateral outlets on opposing sides of the central body, and granular fertilizer is delivered through an outlet opening of the central body facing rearward and downward so as to be deposited in a central row disposed between the seed and fluid fertilizer deposits. This embodiment thus includes three material passages extending through the hollow interior of the central body's delivery portion, namely a seed passage communicating the seed tube inlet with the seed outlet at one side of the outlet chamber, a fluid fertilizer passage provided by the fertilizer tube 218 passing into the outlet chamber to the outlet at the other side thereof, and a granular fertilizer passage communicating the granular fertilizer tube inlet with the central outlet 220 facing downward and rearward adjacent the bottom of the sloped rear end of the central body.

Referring to FIG. 11, the closure member 204 is secured to the central body 12 of the opener by a mounting cover 222 cooperating with the closure member 204 to complete the cover assembly 202 of the opener. Two parallel upper side wall sections 224 and a connecting front wall section 226 of the mounting cover 222 correspond to the side walls 206 and front wall 210 of the closure member 204, respectively, to fit face-to-face therewith against the outer surfaces of these walls facing away from the central body that they embrace about. Top flanges 228 of the mounting cover 222 project horizontally inward toward one another from the opposing upper side wall sections 224 of the mounting cover. The distal edge of each flange 228 opposite the respectively upper side wall section 224 from which it projects is contoured to fit the flange around the respective side of the closure member block 212. That is, a rear arcuate recess in this distal edge curves along the periphery of the granular fertilizer section 212c of the block 212, and a front arcuate extent of this distal edge marks the forward end of the flange 228 where it curves to the laterally outermost extent of the periphery of the seed section 212a of the block, where the flange 228 ends and the front wall section 226 of the mounting cover 222 extends around the front of the opener's central body to the diametrically opposite point around the seed section 212a. Other than at these arcuate portions form fitting the flange 228 to the cylindrical front and rear sections of the closure member block 212, the distal edge of each flange 228 extends linearly in a direction parallel to the respective side wall 32 of the opener's central body 12.

Lowering the mount cover 222 into place atop the closure member 204 seats the flanges 228 flush atop the closure member's top wall 208 along opposite sides thereof. Immediately beneath each upper side wall section 224, the mounting cover 222 projects a short distance inward and then once again depends vertically downward, forming lower side wall sections 230 below and inward from the upper wall sections 224 to situated these lower wall sections face-to-face against the outer surfaces of the central body side walls 32 below the closure member 204. Aligned horizontal through-holes are provided in the lower wall sections 230 for alignment with the aligned horizontal through-holes 86 passing through the side walls 32 of the opener's central body 12, like in the other embodiments, so that a bolt fastener 232 can be passed through the aligned holes in the mounting cover and the opener's central body to cooperate with a nut on the opposite side of the opener to clamp the mounting cover 222 against the central body 12 with the closure member between the mounting cover 222 and the central body 12. With the closure member and mounting cover extending from adjacent the rear end 16 of the opener's central body to, and around, the front end thereof, this clamping of the rubber closure member forces it against the central body around the sides and front thereof, thereby sealing off the open top end of the central body from the rear end to the front end.

Figure 13:
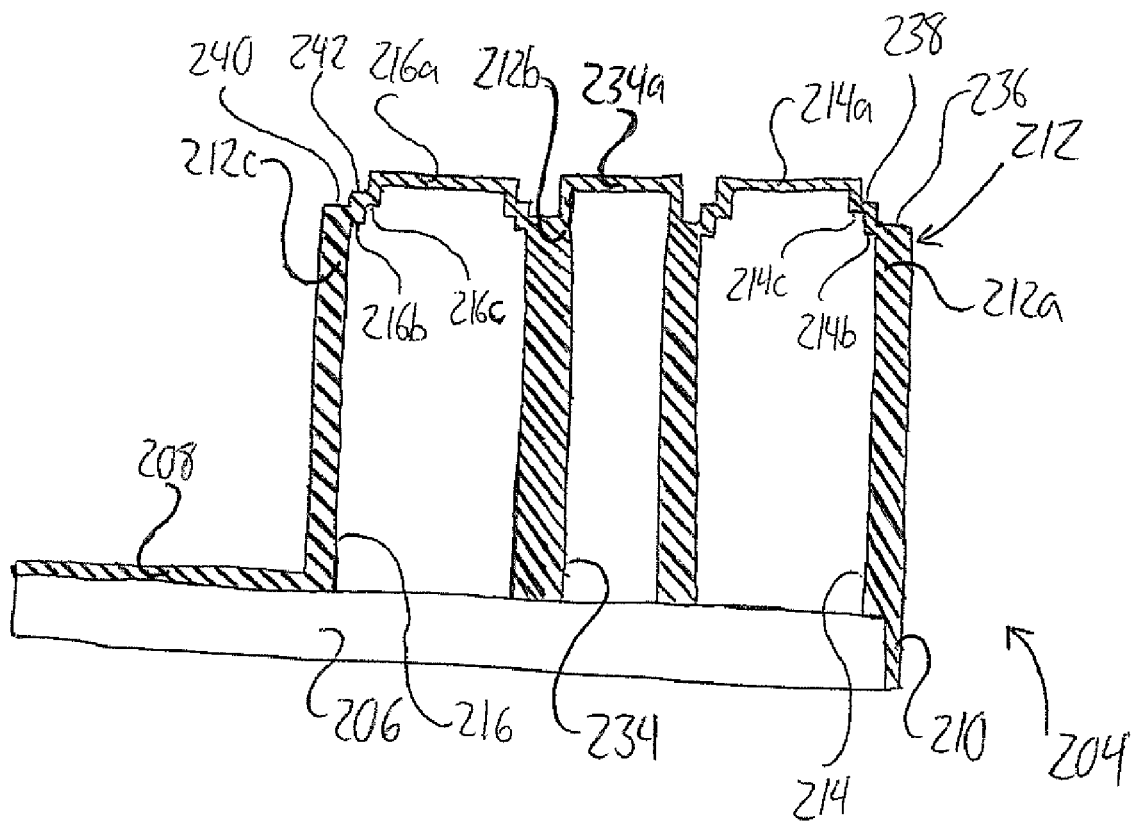
FIG. 13 is a cross sectional view of a closure member of the waterproof top cover of FIG. 10 prior to installation of the opener.

FIG. 13 shows a cross section of the closure member 204 of the waterproof cover assembly 202 prior to installation the central body 12 of the opener. The illustrated rubber closure member 204 is produced using known molding techniques to originally have the closed-top structure of FIG. 13, where the front seed tube bore 214, the rear granular fertilizer tube bore 216 and the middle fertilizer tube bore 234 do not extend fully through the inlet block 212 portion of the closure member 204, but rather are blind holes extending into the block 212 through the top wall 208 thereof. The cover assembly 202 is installed only after the central body 12 is mounted on the shank of a seeder or drill, as access to the fastener openings 92, 94 in the rear plate 90 of the opener is required through the open top of the central body 12 to effect this mounting of the opener on the implement shank.

With reference to FIG. 12, the fluid fertilizer tube 218, for example a stainless steel tube intended for use with anhydrous fertilizer, is fixed to the central body 12 during production thereof, for example by welding to the central body side walls 32, so as to project upward through the open top of the central body's hollow delivery portion. Foam insulation may be applied around the stainless steel tube inside the hollow interior of the central body and inside the respective side of the outlet chamber to insulate the fluid fertilizer line for use with anhydrous ammonia fertilizer. A top end 218a of the fertilizer tube 218 is given an angled configuration by cutting of the tube 218 along a sloped plane obliquely angled relative to its axis. Once the central body and the fertilizer tube fixed thereto have been mounted on a shank, the closure member 204 can then be lowered onto the top of the central body by placing the middle bore 234 in the closure member inlet block 212 over the angled top end 218a of the fertilizer tube and sliding the closure member 204 downward therealong. During this sliding of the closure member down onto the top of the central body 12, the sharp top end 218a of the fertilizer tube pierces through the originally closed end 234a of the middle bore 234 so that the fertilizer tube now projects fully through the closure member 204 to situate its top end over the inlet block 212 thereof and tightly seal the rubber of the inlet block around the fertilizer tube 218 at the formerly closed top end 234a of the middle bore 234.

The seed tube bore 214 in the front section 212a of the closure member inlet block 212 originally has a closed upper end 214a as well. Moving upward along the bore 214 toward this closed top end 214a, the bore 214 has two stepwise reductions 214b, 214c in diameter adjacent this top end, and the outer periphery of the front section 212a accordingly steps down in diameter twice moving toward the top end of the inlet block 212. The top end of the seed tube bore 214 is opened by cutting horizontally through the front section 212a of the rubber closure member 204 at one of the two steps 236, 238 in the outer periphery thereof adjacent the originally closed top end 216a. Cutting through the front section 212a at the bottom step 236 of these two outer steps 236, 238 gives the seed tube bore 214 a larger diameter at its effective top end than cutting through the front section 212a at the top step 238. The outer steps accordingly provide visible indicators of where to cut the front section 212a to select a respective one of the possible inner diameters near the top of the seed tube bore 214 based on the diameter of the seed hose to be inserted into the rubber seed tube and sealed against by the cut upper end of the rubber seed tube. The front section 212a may be cut at the top outer step 238 at the factory to open the top end of the seed tube bore at the smallest possible upper diameter, leaving it up to the end owner, installer or user to re-cut a lower effective top end of the seed tube should a larger diameter seed inlet be required to receive a larger diameter seed hose.

The granular fertilizer bore 216 is also adjustable in its upper diameter in the same manner as the seed bore 214 to accommodate tight sealing against a selected one of differently sized granular fertilizer hoses. However, the granular fertilizer bore 216 is preferably left closed at the factory to allow the end owner, installer or user to decide whether to open this bore 216. Should there be no intention of using the opener to deliver granular fertilizer down the rear bore for exit through the central outlet 220, then this rear bore 216 can be left closed to prevent straw or other material or debris from entering this bore 214 and hollow central body interior thereebeneath. The granular fertilizer bore 216 in the rear section 212c of the closure member inlet block 212 thus originally has a closed upper end 216a. Moving upward along the bore 216 toward this closed top end 216a, the bore 216 has two stepwise reductions 216b, 216c in diameter adjacent this top end, and the outer periphery of the rear section 212c accordingly steps down in diameter twice moving toward the top end of the inlet block 212. The top end of the granular fertilizer bore 216 is opened, when desirable, by cutting horizontally through the rear section 212c of the rubber closure member block 212 at one of the two steps 240, 242 in the outer periphery thereof adjacent the originally closed top end 216a. Cutting through the rear section 212c at the bottom step 240 of these two outer steps 240, 242 gives the granular fertilizer bore 216 a larger diameter at its effective top end than cutting through the rear section 212c at the top step 242. The outer steps accordingly provide visible indicators of where to cut the rear section 212c to select a respective one of the possible inner diameters near the top of the granular fertilizer bore 216 based on the diameter of the seed hose to be inserted into the rubber granular fertilizer tube.

The seed and granular fertilizer inlets are thus each resizable to a larger diameter by cutting away the portion of the respective section of the block 212 that defines both the top inlet end of the respective bore and one or more diameter-changing steps in the bore's peripheral wall, thereby defining a new effective inlet end further downward along the bore axis than the original closed end of the bore. This new effective inlet has a larger diameter corresponding to the larger of the two diameters on opposite sides of the cut-away step nearest the remainder of the original bore still intact with the top wall of the closure member. The rubber closure member thus provides a sealing closure of the opener that is adaptable to cooperate with varying sizes of seed hoses so that the sealed fit can be established with the end-user's existing seeder or drill equipment.

Although described herein above in terms of an opener arranged for selective use in a triple shoot configuration delivery granular fertilizer, fluid fertilizer and seed, it will be appreciated that a rubber closure member may similarly be used in double shoot openers to seal closed the top end of the central body around the seed and fertilizer inlets to prevent liquid from entering the hollow interior of the opener.

It may be possible to produce openers having features of the present invention through modification of existing paired row openers for delivery of fertilizer through one of the original seed outlets thereof, for example by adapting a paired row opener of a central body and outlet chamber construction to install an anhydrous ammonia or liquid fertilizer tube and/or a divider or barrier plate in the manner described herein above, or otherwise modifying an existing paired row opener to communicate one of the seed passages/outlets with a fertilizer delivery source.

The seeder or drill equipment for which the double shoot opener described herein is intended to cooperate is well known, and so such equipment and the connections thereof to the opener have not been illustrated or described in great detail.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An opener for mounting on a shank of an agricultural implement, the opener comprising:
    a hollow central body having a mounting portion arranged for mounting on the shank;
    furrowing portions carried on the central body and arranged to form a seed bed as the central body is pulled through ground on the shank in a forward working direction, the furrowing portion comprising first and second leading edges situated on opposite first and second sides of the central body respectively;
    a seed delivery passage comprising a seed inlet and a seed outlet at opposite ends thereof and being operable to deliver seed onto the seed bed, the seed delivery passage extending through the hollow central body in front of the mounting portion thereof to the seed outlet, which is situated on the first side of the central body in a position leading the mounting portion in the forward working direction and trailing the first leading edge of the furrowing portions in the forward working; and
    a fertilizer delivery passage comprising a fertilizer inlet and a fertilizer outlet at opposite ends thereof and being operable to deliver fertilizer onto the seed bed, the fertilizer delivery passage extending through the hollow central body in front of the mounting portion thereof to the fertilizer outlet, which is situated on the second side of the central body in a position leading the mounting portion in the forward working direction and trailing the second leading edge of the furrowing portion in the forward working direction;
    whereby the double shoot opener is operable to deliver the seed and the fertilizer through the hollow central body onto the same seed bed from ahead of the shank on opposite sides of the central body.

2. The opener according to claim 1 wherein the seed outlet opens rearwardly to face at least partly in a direction opposite the forward working direction.

3. The opener according to claim 1 wherein the fertilizer outlet opens rearwardly to face at least partly in a direction opposite the forward working direction.

4. The opener according to claim 1 wherein the seed and fertilizer outlets each open rearwardly to face at least partly in a direction opposite the forward working direction.

5. The opener according to claim 1 wherein each outlet opening rearwardly also faces partly in a laterally outward direction away from the central body.

6. The opener according to claim 1 wherein the seed and fertilizer outlets are each located entirely laterally outward from the central body.

7. The opener according to claim 1 comprising a common delivery chamber through which the seed and fertilizer passages extend to the seed and fertilizer outlets.

8. The opener according to claim 7 wherein the common delivery chamber is carried on the central body, spans thereacross from the first side to the second side and trails the leading edges of the furrowing portions in the forward working direction.

9. The opener according to claim 7 wherein one of the passages comprises a conduit passing through the delivery chamber without communication between interiors of the conduit and the chamber.

10. The opener according to claim 9 wherein the other one of the passages is in open communication with the chamber through which it passes.

11. The opener according to claim 7 wherein the seed and fertilizer outlets are defined at openings in the chamber.

12. The opener according to claim 7 wherein the chamber comprises a barrier positioned between the seed and fertilizer passages to prevent mixing of the seed and fertilizer within the chamber.

13. The opener according to claim 12 wherein the barrier is arranged to prevent discharge of the seed through the fertilizer outlet and discharge of fertilizer through the seed outlet.

14. The opener according to claim 1 wherein the fertilizer passage comprises a tube arranged to receive fluid fertilizer at the inlet end thereof.

15. The opener according to claim 14 comprising an insulation layer fitted about the tube and wherein the tube is arranged to receive anhydrous ammonia fertilizer at the inlet end thereof.

16. The opener according to claim 1 comprising a connection element proximate a rear end of the central body for cooperation with a corresponding connection element defined on the shank of the agricultural implement to facilitate coupling thereto, the seed and fertilizer outlets leading the connection element in the forward working direction.

17. The opener according to claim 1 comprising covering surfaces carried on the central body and each extending between a respective one of the first and second leading edges and a respective one of the seed and fertilizer outlets on a respective one of the first and second sides of the central body.

18. The opener according to claim 1 comprising an additional fertilizer delivery passage that comprises an additional fertilizer inlet and an additional fertilizer outlet at opposite ends thereof and is operable to deliver a second fertilizer onto the seed bed, the additional fertilizer outlet being situated on between the fertilizer outlet and seed outlet in a transverse direction crossing the forward working direction.

19. The opener according to claim 18 wherein the fertilizer passage comprises a tube arranged to receive fluid fertilizer at the inlet end thereof, the additional fertilizer delivery passage comprises a hollow interior portion of the central body through which granular fertilizer can be delivered, and the additional fertilizer outlet comprises an opening in the central body.

\* \* \* \* \*